(12) United States Patent
Fawaz et al.

(10) Patent No.: US 9,208,125 B2
(45) Date of Patent: Dec. 8, 2015

(54) METHODS FOR OPERATING AND CONFIGURING A RECONFIGURABLE PROCESSOR

(71) Applicants: Khodor Ahmad Fawaz, Edinburgh (GB); Tughrul Sati Arslan, Edinburgh (GB)

(72) Inventors: Khodor Ahmad Fawaz, Edinburgh (GB); Tughrul Sati Arslan, Edinburgh (GB)

( * ) Notice: Subject to any disclaimer, the term of this patent is extended or adjusted under 35 U.S.C. 154(b) by 0 days.

(21) Appl. No.: 14/283,746

(22) Filed: May 21, 2014

(65) Prior Publication Data

US 2014/0351556 A1   Nov. 27, 2014

(30) Foreign Application Priority Data

May 22, 2013   (GB) .................................. 1309258.0

(51) Int. Cl.
*G06F 17/50* (2006.01)
*G06F 15/80* (2006.01)

(52) U.S. Cl.
CPC ........................ *G06F 15/80* (2013.01)

(58) Field of Classification Search
CPC . G06F 15/7867; G06F 9/3828; G06F 9/3897; G06F 9/3836; G06F 9/3867; G06F 9/3885; G06F 15/80; G06F 8/443
USPC ................................................ 716/104, 126
See application file for complete search history.

(56) References Cited

U.S. PATENT DOCUMENTS

| 6,074,429 A | 6/2000 | Pullela et al. |
| 6,219,819 B1 | 4/2001 | Vashi et al. |
| 7,734,895 B1 * | 6/2010 | Agarwal et al. ................. 712/13 |

FOREIGN PATENT DOCUMENTS

WO   WO 2006/114642   11/2006

OTHER PUBLICATIONS

Search Report for GB 1309258.0 dated Nov. 4, 2013.

* cited by examiner

*Primary Examiner* — Vuthe Siek
(74) *Attorney, Agent, or Firm* — Nixon & Vanderhye PC

(57) ABSTRACT

The invention provides a method of compiling computer program instructions for implementation on a reconfigurable processor comprising a plurality of operational cells, each operational cell being connectable to and disconnectable from one or more of the other operational cells via a programmable interconnect, the method comprising: a routing step in which one or more signal processing paths are determined for performing one or more signal processing operations defined by the computer program instructions, each signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step performed subsequent to the routing step in which an extended signal processing path is determined by extending one of the said signal processing paths determined in the routing step such that a critical path of the extended signal processing path is longer than a longest critical path of the signal processing paths determined in the routing step.

22 Claims, 12 Drawing Sheets

METHODS FOR OPERATING AND CONFIGURING A RECONFIGURABLE PROCESSOR

This application claims priority to GB 1309258.0 filed 22 May 2013, the entire contents of each of which are hereby incorporated by reference.

FIELD OF THE INVENTION

The invention relates to a method of compiling computer program instructions, a compiler for compiling computer program instructions, data processing apparatus comprising a reconfigurable processor and a compiler for compiling computer program instructions for implementation on the reconfigurable processor, a reconfigurable processor, a method of operating a reconfigurable processor, a computer implemented method of compiling computer program instructions, a computer implemented method of operating a reconfigurable processor, a non-transitory computer readable medium storing computer readable code for causing a computer to perform a method of operating a reconfigurable processor or for performing a method of compiling computer program instructions and a computer running a compiler.

BACKGROUND TO THE INVENTION

Reconfigurable microprocessors typically comprise a plurality of operational cells arranged in a grid, each operational cell being connectable to and disconnectable from other operational cells of the grid via a programmable interconnect. Data is processed by implementing a first set of reconfigurable signal processing paths comprising respective operational cells connected via the interconnect, processing the data along the first reconfigurable signal processing paths, implementing a second set of reconfigurable signal processing paths comprising respective operational cells connected via the interconnect, processing the data along the second reconfigurable signal processing paths and so on.

Routing circuitry is triggered to implement each subsequent set of reconfigurable signal processing paths by a global clock, even when the operational cells are asynchronous. Accordingly, there is typically a delay between the completion of signal processing (including settling time) by a given set of signal processing paths and the next clock cycle. Clock granularity is a factor affecting the average length of this delay. Over time, these delays accumulate and reduce the efficiency of the processor.

In addition, estimated signal propagation delays are relied upon to estimate when signal processing by a particular configuration will be complete. These signal propagation delays are typically "worst-case scenario" delays taking into account a range of environmental (e.g. temperature) conditions in which the processor is required to operate. This can lead to a delay of one or more clock cycles between completion of signal processing by the configuration and the clock cycle which triggers reconfiguration of the processor, again incurring unnecessary delays.

One way in which data processing speeds can be improved is to increase the clock speed. However, even if clock speed is increased, clock granularity would still be a factor affecting performance as there would still be a delay incurred between completion of signal processing and the next clock cycle. In addition, faster clocks are typically more expensive than slower clocks, and there are limits on how fast clocks can run. Furthermore, it would still be necessary to rely on estimated "worst-case scenario" signal processing delays before the processor can be reconfigured.

Accordingly, it would be advantageous to improve the way in which reconfigurable microprocessors operate in order to reduce these delays, so as to improve their efficiency and the speed at which they can process data.

SUMMARY OF THE INVENTION

A first aspect of the invention provides a method of compiling computer program instructions for implementation on a reconfigurable processor comprising a plurality of operational cells, each operational cell being connectable to and disconnectable from one or more of the other operational cells via a programmable interconnect, the method comprising: a routing step in which one or more signal processing paths are determined for performing one or more signal processing operations defined by the computer program instructions, each signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step performed subsequent to the routing step in which an extended signal processing path is determined by extending one of the said signal processing paths determined in the routing step such that a critical path of the extended signal processing path is longer than a longest critical path of the signal processing paths determined in the routing step.

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells. Typically, the operational cells of the processor (and the operational cells of one or more or all of the signal processing paths) comprise one or more asynchronous operational cells or the operational cells of the processor (and the operational cells of the signal processing paths) consist of asynchronous operational cells.

Typically the extended signal processing path and the remaining signal processing paths determined in the routing step (i.e. those reconfigurable signal processing paths determined in the routing step other than the path which was extended in the post-routing step) are capable of being implemented in parallel (simultaneously) on the reconfigurable processor.

It will be understood that each of the reconfigurable signal processing paths determined in the routing step and the extended signal processing path determined in the post-routing step may comprise a plurality of data flow paths along each of which data is processed. It will also be understood that the critical path of each signal processing path is the longest data flow path of the respective signal processing path along which data is processed (i.e. the data flow path which incurs the greatest (electronic) signal processing time, including for example signal propagation delays, settling time and processing by the operational cells of that path). The "longest critical path" of the signal processing paths determined in the routing step is the critical path of the reconfigurable signal processing paths determined in the routing step which incurs the greatest (electronic) signal processing time, including for example signal propagation delays, settling time and processing by the operational cells.

Typically, the method comprises extending the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete.

The method may further comprise selecting the end-point cell from a plurality of cells of the reconfigurable processor configurable to operate as the end-point cell.

A cell "configurable to operate as the end-point cell" is typically an operational cell from which a said trigger signal can be derived (i.e. through existing hard-wired and/or programmable electronic connections such as the programmable interconnect).

A cell which is "not configurable to operate as the end-point cell" is a cell from which a said trigger signal cannot be derived (i.e. using existing hard-wired or programmable electronic connections).

The said plurality of cells configurable to operate as the end-point cell may comprise one or more of the operational cells.

It may be that the plurality of cells configurable to operate as the end-point cell comprises all of the said operational cells. In this case, the method may comprise deriving the said trigger signal from the cell at which the critical path of the extended reconfigurable signal processing path terminates, or from signals transmitted by the said cell at which the extended reconfigurable signal processing path terminates, when signal processing along the critical path of the extended signal processing path is complete.

Particularly where a large number of operational cells are provided, the size and complexity overhead required for each operational cell to be configurable to operate as the end-point cell can be significant. Accordingly, it may be that not all of the operational cells are configurable to operate as the end-point cell in order to reduce this overhead. For example, it may be that there is no circuitry provided to derive the trigger signal from one or more of the operational cells. Thus, in some embodiments, it may be that one or more of the operational cells are not comprised within the said plurality of cells configurable to operate as the end-point cell.

Preferably, the cells configurable to operate as the end-point cell are (preferably evenly) distributed throughout the array.

Typically, less than 10% (and in some cases less than 5%) of the cells of the array are configurable to operate as the end-point cell. In some embodiments, it may be that only a single cell is configurable to operate as the end-point cell. However, it is more preferable in most embodiments that a plurality of cells are configurable to operate as the end-point cell.

In order to ensure that the trigger signal is derived from the cell at which the longest critical path terminates, thereby ensuring that the processor is only reconfigured when signal processing by all of the signal processing paths of a particular configuration is complete, it is necessary to correctly identify the longest critical path. The post-routing step ensures that the longest critical path is correctly identified without imposing a significant signal processing burden on the routing step.

In addition, where not all of the cells of the processor are configurable to operate as the end-point cell, it may be that the longest critical path of the signal processing paths determined in the routing step terminates at a cell which is not configurable to operate as the end-point cell. The post-routing step also ensures that the longest critical path terminates at a cell configurable to operate as the end-point cell.

By ensuring that the longest critical path of the configuration to be implemented on the processor terminates at the end-point cell via a post-routing step in this way, no additional burden is placed on the routing step performed by the routing circuitry (e.g. to ensure that the longest critical path terminates at a cell configurable to operate as the end-point cell). Accordingly, existing routing algorithms can be employed during the routing step.

The method may further comprise a pre-routing step performed prior to the routing step in which a provisional routing configuration is determined based on one or more estimated parameters (e.g. signal propagation delays) of the operational cells (and optionally the programmable interconnect).

The programmable interconnect may comprise one or more interconnect cells (e.g. interconnect switchbox, interconnect register).

The plurality of cells configurable to operate as the end-point cell may comprise one or more of the interconnect cells.

The post-routing step may comprise: determining a plurality of possible extended signal processing paths, each of the said plurality of possible extended signal processing paths being determined by extending a respective one of the said signal processing paths determined in the routing step such that its critical path is longer than the longest critical path of the signal processing paths determined in the routing step and such that its critical path terminates at a cell configurable to operate as the end-point cell; and selecting the possible extended signal processing path which comprises the shortest extension of the plurality of possible extended signal processing paths.

Possible extended signal processing paths may be determined in respect of one or more of the reconfigurable signal processing paths determined in the routing step or in respect of each reconfigurable signal processing path determined in the routing step. A plurality of possible extended signal processing paths may be determined in respect of a single one of the reconfigurable signal processing paths determined in the routing step.

The step of determining the possible extended signal processing paths typically comprises (typically independently) extending the critical paths of the said reconfigurable signal processing paths determined in the routing step. Typically, each of the said plurality of possible extended signal processing paths is determined by (typically independently) extending the critical path of a respective one of the said signal processing paths such that it comprises a critical path which is longer than the longest critical path of the said signal processing paths determined in the routing step and such that the said critical path of the extended signal processing path terminates at a cell configurable to operate as the end-point cell. However, we do not exclude the possibility of extending non-critical paths of the said reconfigurable signal processing paths determined in the routing step.

A benefit of determining the said plurality of possible extended signal processing paths and selecting the extended signal processing path requiring the shortest extension in the post-routing step is that fewer cells need to be configurable to operate as the end-point cell for efficient operation of the processor. This is because the chances are increased of a cell configurable to operate as the end-point cell being available which requires only a short extension of one of the signal processing paths (compared to, for example, if the longest critical path of the paths determined in the routing step had to be extended to terminate at a cell configurable to operate as the end-point cell). By providing fewer cells configurable to operate as the end-point cell, the required additional overhead in terms of the size of the processor (e.g. the footprint of the additional circuitry required to process signals from the cells configurable to operate as the end-point cell), complexity and additional signal propagation time is reduced.

It will be understood that the longest critical path of the said signal processing paths determined in the routing step may in some cases terminate at a cell configurable to operate as the end-point cell, in which case the post-routing step may not be required. Thus, the method may comprise: determining whether the longest critical path of the said signal processing paths determined in the routing step terminates at a cell configurable to operate as the end-point cell; and performing the post-routing step responsive to a determination that a longest critical path of the said signal processing paths determined in the routing step does not terminate at a cell configurable to operate as the end-point cell. Performing the post-routing step responsive to a determination that the longest critical path of the signal processing paths determined in the routing step does not terminate at a cell which is configurable to operate as the end-point cell allows the post-routing step to be omitted in the event that the routing step does terminate at a cell which is configurable to operate as the end-point cell. This improves the efficiency of the method.

It may be that, excluding a signal processing delay incurred by the end-point cell, the critical path of the extended signal processing path has a signal path length equal to that of the critical path of one of the other paths determined in the routing step. In this case, the signal processing delay incurred by the end-point cell provides a "safety margin" which ensures that signal processing along all of the critical paths is complete when signal processing along the critical path of the extended signal processing path is complete. Alternatively, it may be that the critical path of the extended signal processing path has a longer signal path length than the critical paths of all of the other paths determined in the routing step, excluding the said signal processing delay incurred by the end-point cell. This provides a greater "safety margin" for ensuring that the signal processing along all of the critical paths is complete when signal processing along the critical path of the extended signal processing path is complete.

The method may comprise determining which of the critical paths of the paths determined in the routing step is the longest critical path. The method may further comprise: determining that a critical path of the paths determined in the routing step terminates at a cell configurable to operate as the end-point cell; and determining which of the critical paths of the paths determined in the routing step is the longest critical path excluding a signal processing delay of the said cell configurable to operate as the end-point cell. The method may further comprise: determining that a plurality of critical paths of the paths determined in the routing step are of equal length excluding the signal processing delay of the cell configurable to operate as the end-point cell; and selecting the critical path which terminates at the said cell configurable to operate as the end-point cell as the longest critical path.

It may be that the path which is extended in the post-routing step did not comprise the longest critical path of the paths determined in the routing step. Accordingly, it may be that the reconfigurable signal processing path which did not comprise the longest critical path of the paths determined in the routing step is extended to comprise the longest critical path. Alternatively, it may be that the path which comprised the longest critical path of the paths determined in the routing step (said longest critical path of the paths determined in the routing step not terminating at a cell configurable to operate as the end-point cell) was extended such that it terminates at a cell configurable to operate as the end-point cell.

Each of the said one or more signal processing paths typically has a critical path, and the step of extending the said signal processing path typically comprises extending the critical path thereof. However, we do not exclude the possibility of extending a non-critical path of the said signal processing path.

The method may further comprise storing the extended signal processing path in a memory (typically together with the paths determined in the routing step which were not extended in the post-routing step). In this case, a reconfigurable processor can implement the extended (and typically the said non-extended) signal processing path(s) by retrieving the extended signal processing path from the memory and implementing it (them) on its operational cells and interconnect.

The end-point cell may be a dedicated end-point cell. That is, the end-point cell may be a cell which is not used in any reconfigurable signal processing paths implemented on the processor other than at the end of the longest critical path of a particular configuration (i.e. at the end of the critical path of the extended signal processing path). A benefit of employing a dedicated end-point cell is that an existing state of the end-point cell does not need to be preserved.

Alternatively, the end-point cell may be a cell which is used in (e.g. as an operational cell or interconnect cell in a reconfigurable signal processing path of) previous and/or subsequent configurations at (e.g. an intermediate position of) any of the reconfigurable signal processing paths (including both longest critical paths and paths which are not the longest critical paths). Where the end-point cell is intended to be used as an operational or interconnect cell of any of the reconfigurable signal processing paths (including both longest critical paths and paths which are not the longest critical paths) of a previous or subsequent signal processing configuration, the cell may be provided with an "end-point" mode which allows its "normal function" (i.e. its function when not operating as the end-point cell) to be disabled and its current state to be preserved when operated as the end-point cell.

The computer program instructions may be compiled "offline", i.e. independently of the execution of a computer program product implementing the said computer program instructions. In this case, the signal processing paths (including the said extended signal processing path) may be stored in a memory and implemented when the computer program product is executed. Alternatively, the computer program instructions may be compiled when a computer program product implementing the said computer program instructions is executed (e.g. as part of the "loading" process of such a computer program product into random access (fast) memory of a computer running the computer program product). In this case, the signal processing paths (including the extended signal processing path) are determined and stored in a memory during execution of such a computer program product.

A second aspect of the invention provides a compiler for compiling computer program instructions for implementation on a reconfigurable processor comprising a plurality of operational cells, each operational cell being connectable to and disconnectable from one or more of the other operational cells via a programmable interconnect, the compiler comprising a routing module configured to perform: a routing step in which one or more reconfigurable signal processing paths are determined for performing one or more signal processing operations defined by the computer program instructions, each reconfigurable signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step subsequent to the routing step in which an extended signal processing path is determined by extending one of the said signal processing paths such that a critical path of the extended signal processing path is longer than a longest critical path of the reconfigurable signal processing paths determined in the routing step.

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells. Typically, the operational cells of the processor (and the operational cells of one or more or all of the signal processing paths) comprise one or more asynchronous operational cells or the operational cells of the processor (and the operational cells of the signal processing paths) consist of asynchronous operational cells.

The routing module may be further configured to perform a pre-routing step prior to the routing step in which a provisional routing configuration is determined based on one or more estimated parameters (e.g. signal propagation delays) of the operational cells (and optionally the programmable interconnect).

The routing module may be configured to extend the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete.

Typically, the end-point cell is selected from a plurality of cells of the reconfigurable processor configurable to operate as the end-point cell.

The said plurality of cells configurable to operate as the end-point cell may comprise one or more of the operational cells.

It may be that one or more of the operational cells are not comprised within the said plurality of cells configurable to operate as the end-point cell. Alternatively, the plurality of cells configurable to operate as the end-point cell may comprise all of the said operational cells.

The programmable interconnect may comprise one or more interconnect cells.

The plurality of cells configurable to operate as the end-point cell may comprise one or more of the interconnect cells.

The routing module may be configured to perform the post-routing step responsive to a determination that a longest critical path of the said signal processing paths determined during the routing step does not terminate at a cell configurable to operate as the end-point cell.

It may be that, excluding a signal processing delay incurred by the end-point cell, the critical path of the extended signal processing path has a signal path length equal to that of the critical path of one of the other paths determined in the routing step. In this case, the signal processing delay incurred by the end-point cell provides a "safety margin" which ensures that signal processing along all of the critical paths is complete when signal processing along the critical path of the extended signal processing path is complete. Alternatively, it may be that the critical path of the extended signal processing path has a longer signal path length than the critical paths of all of the other paths determined in the routing step, excluding the said signal processing delay incurred by the end-point cell. This provides a greater "safety margin" for ensuring that the signal processing along all of the critical paths is complete when signal processing along the critical path of the extended signal processing path is complete.

The routing module may be configured to determine which of the critical paths of the paths determined in the routing step is the longest critical path. The routing module may be configured: to determine that a critical path of the paths determined in the routing step terminates at a cell configurable to operate as the end-point cell; and to determine which of the critical paths of the paths determined in the routing step is the longest critical path excluding a signal processing delay of the said cell configurable to operate as the end-point cell. The routing module may be further configured: to determine that a plurality of critical paths of the paths determined in the routing step are of equal length excluding the signal processing delay of the cell configurable to operate as the end-point cell; and to select the critical path which terminates at the said cell configurable to operate as the end-point cell as the longest critical path.

In the post-routing step the routing module may be configured to: determine a plurality of possible extended signal processing paths, each of the said plurality of possible extended signal processing paths being determined by extending one of the said signal processing paths determined in the routing step such that it comprises a critical path which is longer than the longest critical path of the said signal processing paths determined in the routing step and such that the critical path of the extended signal processing path terminates at a cell configurable to operate as the end-point cell; and to select the possible extended signal processing path which requires the shortest extension of the plurality of possible extended signal processing paths.

Each of the said one or more signal processing paths determined in the routing step typically has a critical path, and the routing module is typically configured to extend the critical path of the said signal processing path in the post-routing step.

The compiler may be run "offline", i.e. independently of the execution of a computer program product implementing the said computer program instructions. In this case, the signal processing paths (including the said extended signal processing path) may be stored in a memory and implemented when the computer program product is executed. Alternatively, the compiler may be run when a computer program product implementing the said computer program instructions is executed (e.g. as part of the "loading" process of such a computer program product into fast memory of a computer running the computer program product). In this case, the signal processing paths (including the extended signal processing path) are determined and stored in a memory during execution of such a computer program product.

A third aspect of the invention provides data processing apparatus comprising: a reconfigurable processor comprising a plurality of operational cells, each operational cell being connectable to and disconnectable from one or more of the other operational cells via a programmable interconnect; and a compiler for compiling computer program instructions for implementation on the reconfigurable processor, the compiler comprising a routing module configured to perform: a routing step in which one or more reconfigurable signal processing paths are determined for performing one or more signal processing operations defined by the computer program instructions, each reconfigurable signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step subsequent to the routing step in which an extended signal processing path is determined by extending one of the said signal processing paths determined in the routing step such that a critical path of the extended signal processing path is longer than a longest critical path of the reconfigurable signal processing paths determined in the routing step.

The operational cells typically comprise functional processing units, such as arithmetic logic units or registers.

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. In this case, a global clock may be provided, and the synchronous operational cells operate with reference to the global clock. The global clock is typically in communication with the routing circuitry.

The operational cells of the processor may consist of asynchronous operational cells. The operational cells of one or more or all of the signal processing paths may consist of asynchronous operational cells. Alternatively, the operational cells of the processor may consist of synchronous operational cells (in which case, a global clock is provided, and the synchronous cells operate with reference to the global clock, the global clock typically being in communication with the routing circuitry). The operational cells of one or more or all of the signal processing paths may consist of synchronous operational cells (in which case, a global clock is again provided, and the synchronous cells operate with reference to the global clock, the global clock typically being in communication with the routing circuitry).

Typically the operational cells of the processor (and the operational cells of one or more or all of the signal processing paths) comprise one or more asynchronous operational cells or the operational cells of the processor (and the operational cells of the signal processing paths) consist of asynchronous operational cells.

Typically, the reconfigurable processor comprises three or more operational cells. In some embodiments, the operational cells are provided in a X×Y array (typically in a grid arrangement), where X, Y are integers. For example, X, Y may equal 10, 20 or 30 in some exemplary embodiments. Typically X=Y.

Typically each operational cell is connectable to and disconnectable from two or more operational cells via the programmable interconnect.

It will be understood that the programmable interconnect comprises a plurality of electronic connections which are (typically independently) programmable to be in either an "on" state in which they conduct electronic signals (e.g. between two operational cells) or in an "off" state in which they do not conduct electronic signals (e.g. between two operational cells).

Typically the reconfigurable processor is a reconfigurable microprocessor.

The routing module of the compiler may be configured to extend the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete.

It will be understood that the asynchronous operational cells (where provided) of the reconfigurable processor do not operate with reference to a clock (i.e. a cyclic electronic signal generator to which the signal processing operations of the operational cells are referenced). The routing circuitry may be asynchronous—that is, it may be that the routing circuitry does not operate with reference to a clock. Rather, the routing circuitry operates with reference to the said trigger signal. The programmable interconnect may be, for example, asynchronous or combinatorial interconnect.

The end-point cell may be selected from a plurality of cells of the reconfigurable processor configurable to operate as the end-point cell.

The said plurality of cells configurable to operate as the end-point cell may comprise one or more of the operational cells.

It may be that one or more of the operational cells are not comprised within the said plurality of cells configurable to operate as the end-point cell. Alternatively, the plurality of cells configurable to operate as the end-point cell may comprise all of the said operational cells.

The programmable interconnect may comprise one or more interconnect cells.

The plurality of cells configurable to operate as the end-point cell may comprise one or more of the interconnect cells.

The routing module may be configured to perform the post-routing step responsive to a determination that a longest critical path of the said signal processing paths determined in the routing step does not terminate at a cell configurable to operate as the end-point cell.

The reconfigurable processor may further comprise routing circuitry configurable to reconfigure the processor responsive to the said trigger signal. The routing circuitry may be configurable to reconfigure the processor in direct response (that is, without waiting for any other trigger event such as a clock cycle) to the said trigger signal (e.g. where the operational cells are asynchronous); additionally or alternatively the routing circuitry may be configurable to reconfigure the processor in response to a further trigger event (such as a clock cycle) following the trigger signal (e.g. where the operational cells are synchronous). In both cases, the processor is typically reconfigured more quickly than in existing reconfigurable processors which rely on estimated, "worst-case scenario" signal propagation times and global clocks to trigger reconfiguration of the processor.

The routing module of the compiler may be configured in the post-routing step to: determine a plurality of possible extended signal processing paths, each of the said plurality of possible extended signal processing paths being determined by extending one of the said signal processing paths determined in the routing step such that it comprises a critical path which is longer than the longest critical path of the said signal processing paths determined in the routing step and such that the critical path of the extended signal processing path terminates at a cell configurable to operate as the end-point cell; and to select the possible extended signal processing path which requires the shortest extension of the plurality of possible extended signal processing paths.

Each of the said one or more signal processing paths typically has a critical path, and the routing module of the compiler is typically configured to extend the critical path of the said signal processing path in the post-routing step.

The data processing apparatus according to the third aspect of the invention may further comprise a computer readable medium, wherein the routing module is configured to store the said extended signal processing path on a memory of the computer readable medium. The routing module may also be configured to store on the computer readable medium the signal processing paths determined in the routing step which were not extended in the post-routing step.

A fourth aspect of the invention provides a reconfigurable processor comprising: a plurality of operational cells, each operational cell being connectable to and disconnectable from one or more of the other operational cells via a programmable interconnect; and routing circuitry configured to implement a first signal processing configuration comprising one or more first reconfigurable signal processing paths each comprising two or more of the said plurality of operational cells connected via the said programmable interconnect, each reconfigurable signal processing path having a critical path, wherein a longest critical path of the said first signal processing configuration terminates at an end-point cell, the reconfigurable processor being configured to derive from the end-point cell, or from one or more signals transmitted by the end-point cell, a trigger signal indicating that signal processing along the longest critical path is complete, and wherein the reconfigurable processor is further configured to route the said trigger signal to the routing circuitry, the routing circuitry being configured to reconfigure the processor in accordance with a second signal processing configuration comprising one or more second reconfigurable signal processing paths (one or more of which are typically different from the said first reconfigurable signal processing paths) responsive to the said trigger signal.

By the routing circuitry being configured to reconfigure the processor in accordance with a second signal processing configuration, we typically mean the routing circuitry changes the configuration of the interconnect and/or one or more parameters of one or more of the operational cells so as to clear the first signal processing configuration and to implement the second signal processing configuration. However, we do not exclude the possibility that there is some commonality between the first and second configurations. Indeed, we include and envisage the possibility that two or more successive identical configurations may be implemented on some occasions.

When "implementing" each signal processing configuration, it will be understood that the routing circuitry sets the necessary connections of the programmable interconnect so as to link the operational cells of each path, and sets the necessary parameters of the operational cells where appropriate, so as to configure the processor in accordance with the signal processing paths of each configuration.

Typically the reconfigurable signal processing paths of each configuration are configured to process (electronic) signals in parallel with each other.

It will be understood that each of the first reconfigurable signal processing paths and each of the second reconfigurable signal processing paths may comprise a plurality of data flow paths along each of which data is processed. It will also be understood that the critical path of each signal processing path is the longest data flow path of the respective signal processing path along which data is processed (i.e. the data flow path which incurs the greatest (electronic) signal processing time, including for example signal propagation delays, settling time and processing by the operational cells of that path). The "longest critical path" of the first configuration is the critical path of the first configuration which incurs the greatest (electronic) signal processing time, including for example signal propagation delays, settling time and processing by the operational cells of that path. Similarly the "longest critical path" of the second configuration is the critical path of the second configuration which incurs the greatest (electronic) signal processing time, including for example signal propagation delays, settling time and processing by the operational cells of that path. Thus, when signal processing along the longest critical path of a particular configuration is complete, signal processing along all of the data flow paths and signal processing paths of a particular configuration will typically also be complete.

By configuring the routing circuitry to implement the second signal processing configuration responsive to the said trigger signal, the second signal processing paths are implemented much more quickly after signal processing along all of the first reconfigurable signal processing paths of the first signal processing configuration are complete.

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells.

Typically the operational cells of the processor (and the operational cells of one or more or all of the signal processing paths) comprise one or more asynchronous operational cells or the operational cells of the processor (and the operational cells of the signal processing paths) consist of asynchronous operational cells. In this case, the routing circuitry may be configurable to implement the second signal processing configuration in direct response (that is, without waiting for any other trigger event such as a clock cycle) to the said trigger signal (e.g. where the operational cells are asynchronous). This avoids unnecessary delays incurred, for example in reconfigurable processors where the implementation of new reconfigurable signal processing paths is driven by a global clock, between the completion of signal processing along all of the reconfigurable signal processing paths of the current signal processing configuration and the next global clock cycle. As a result, the reconfigurable processor according to the fourth aspect of the invention can process data more quickly and efficiently.

Additionally or alternatively the routing circuitry may be configurable to reconfigure the processor in response to a further trigger event (such as a clock cycle) following the trigger signal (e.g. where the operational cells are synchronous). In this case, the processor is typically reconfigured more quickly than in existing reconfigurable processors which rely on estimated, "worst-case scenario" signal propagation times and global clocks to trigger reconfiguration of the processor.

The routing circuitry typically implements the signal processing paths of each configuration in accordance with instructions provided by a computer program product stored on a computer readable medium and running on a computer.

The end-point cell may be one of the said operational cells. Alternatively the end-point cell may be an interconnect cell (such as an interconnect switchbox or an interconnect register).

The end-point cell is typically in electronic communication with the routing circuitry via trigger signal derivation circuitry. In some cases it may not be possible to derive a trigger signal from the end-point cell or from signals transmitted by the end-point cell without performing some signal processing. Accordingly, trigger signal derivation circuitry may be provided to perform the signal processing required to derive the trigger signal.

The trigger signal derivation circuitry may be configurable to select the end-point cell from a plurality of cells configurable to operate as the end-point cell and to derive the trigger signal from the selected end-point cell or from one or more signals transmitted therefrom.

In order to ensure that the trigger signal is derived from the end-point cell or from signals transmitted by the end-point cell (and not, for example, the cell at which a path which is not the longest critical path terminates), the trigger signal derivation circuitry is typically configurable to select the end-point cell and to derive the trigger signal therefrom.

The trigger signal derivation circuitry may be configurable to select the end-point cell from a plurality of cells configurable to operate as the end-point cell and to derive the trigger signal therefrom.

The trigger signal derivation circuitry may be configured to derive the trigger signal from a (e.g. handshaking) signal transmitted by the end-point cell when signal processing along the longest critical path of the first configuration is complete.

In some embodiments, the end-point cell transmits a handshaking acknowledgement signal when signal processing along the longest critical path is complete. Accordingly, the trigger signal may be derived from a handshaking acknowledgement signal transmitted by the end-point cell.

The trigger signal derivation circuitry may comprise one or more edge detectors. Each of the one or more edge detectors is typically connected between a respective one of the cells configurable to operate as the end-point cell and the routing circuitry.

The edge detectors are typically configured to sense a rising or falling edge of a signal (e.g. handshaking acknowledgement signal) from which the trigger signal is derived.

The routing circuitry may be configured to identify to the trigger signal derivation circuitry the end-point cell from a plurality of cells configurable to operate as the end-point cell.

By identifying the end-point cell to the trigger signal derivation circuitry, it can be ensured that the trigger signal derivation circuitry derives the trigger signal from the correct cell.

One or more of the operational cells are typically 8-bit or greater.

Typically, each second signal processing path of the second configuration comprises two or more of the said plurality of operational cells, connected via the said programmable interconnect, and a critical path. Typically, the longest critical path of the said second signal processing configuration terminates at a second end-point cell, and the reconfigurable processor is configured to derive from the second end-point cell, or from one or more signals transmitted by the second end-point cell, a second trigger signal indicating that signal processing along the longest critical path of the second signal processing configuration is complete and to route the said second trigger signal to the routing circuitry, and wherein the routing circuitry is configured to reconfigure the processor in accordance with a third signal processing configuration comprising one or more third reconfigurable signal processing paths responsive to the said second trigger signal.

It will be understood that the routing circuitry may be configured to repeat this process a number of times, generating third and subsequent trigger signals, and reconfiguring the processor in accordance with fourth and subsequent configurations comprising respective fourth and subsequent reconfigurable signal processing paths, the processor thereby carrying out instructions defined by a computer program. A plurality of successive configurations defined by the (compiled) computer program may be retrievably stored on a non-transitory computer readable medium (e.g. memory such as RAM, ROM or flash memory) in communication with the routing circuitry, the routing circuitry being configured to implement the successive configurations in the manner described above.

The reconfigurable processor is typically an integrated semiconductor device.

A fifth aspect of the invention provides a method of operating a reconfigurable processor comprising a plurality of operational cells, each operational cell being connectable to and disconnectable from one or more of the other operational cells via a programmable interconnect, the method comprising: implementing a first signal processing configuration comprising one or more first reconfigurable signal processing paths comprising two or more of the operational cells connected via the programmable interconnect, each signal processing path having a critical path, the longest critical path of the said first signal processing configuration terminating at an end-point cell; processing data along the said reconfigurable signal processing paths of the first signal processing configuration; deriving a trigger signal from the end-point cell, or from one or more signals transmitted by the end-point cell, indicating that signal processing along the said longest critical path is complete; and, responsive to the said trigger signal, reconfiguring the processor in accordance with a second signal processing configuration comprising one or more second reconfigurable signal processing paths (one or more of which may be different from the said first reconfigurable signal processing paths).

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells.

Typically the operational cells of the processor (and the operational cells of one or more or all of the signal processing paths) comprise one or more asynchronous operational cells or the operational cells of the processor (and the operational cells of the signal processing paths) consist of asynchronous operational cells. In this case, the method typically comprises reconfiguring the processor in direct response to the said trigger signal.

By "reconfiguring" the processor in accordance with a second signal processing configuration, we typically mean changing the configuration of the interconnect and/or one or more parameters of one or more of the operational cells so as to clear the first signal processing configuration and to implement the second signal processing configuration. However, we do not exclude the possibility that there is some commonality between the first and second configurations. Indeed, we include and envisage the possibility that two successive identical configurations may be implemented on some occasions.

It will be understood that the step of implementing the first and second signal processing configurations may comprise programming one or more electronic connections of the programmable interconnect to an "on" state in which they conduct electronic signals (e.g. between two operational cells) and one or more other electronic connections of the programmable interconnect to an "off" state in which they do not conduct electronic signals (e.g. between operational cells).

The method may further comprise receiving processing instructions from a memory storing one or more computer programs; and implementing the first signal processing configuration in accordance with the said processing instructions. It will be understood that the second signal processing configuration is also typically implemented in accordance with processing instructions received from one or more computer programs (or from a memory storing said instructions) during the reconfiguration step.

Typically the method comprises processing (electronic) signals along each of the signal processing paths of the first configuration in parallel (i.e. processing signals along a plurality of reconfigurable signal processing paths simultaneously).

Typically the reconfigurable processor is a reconfigurable microprocessor.

Typically the reconfigurable signal processing paths of each configuration are configured to process (electronic) signals in parallel with each other.

The end-point cell may be one of the said operational cells. Alternatively, the end-point cell may be an interconnect cell such as an interconnect switchbox or an interconnect register.

The end-point cell is typically in electronic communication with the routing circuitry via trigger signal derivation circuitry. In some cases it may not be possible to derive a trigger signal from the end-point cell or from signals transmitted by the end-point cell without performing some signal processing. Accordingly, trigger signal derivation circuitry may be provided to perform the signal processing required to derive the trigger signal.

In order to ensure that the trigger signal is derived from the end-point cell or from signals transmitted by the end-point cell (and not, for example, the operational cell at which a path which is not the longest critical path terminates), the trigger signal derivation circuitry is typically configured to select the end-point cell and to derive the trigger signal therefrom. Thus, the method may further comprise selecting the end-point cell (e.g. from a plurality of cells configurable to operate as the end-point cell) and deriving the trigger signal from the selected end-point cell or from one or more signals transmitted by the end-point cell.

The method may further comprise: transmitting a signal from the end-point cell when signal processing by the longest critical path of the first configuration is complete; and deriving the trigger signal from the said transmitted signal.

The method may further comprise deriving the trigger signal from a (e.g. handshaking acknowledgement) signal transmitted by the end-point cell when signal processing by the longest critical path of the first configuration is completed.

In some embodiments, the end-point cell transmits a handshaking acknowledgement signal when signal processing along the longest critical path is complete. Accordingly, the trigger signal may be derived from a handshaking acknowledgement signal transmitted by the end-point cell.

The method may further comprise deriving the said trigger signal by sensing a rising or falling edge on a signal transmitted by the end-point cell.

The method may further comprise identifying the end point cell from a plurality of cells configurable to operate as the end-point cell.

It will also be understood that, typically, each signal processing path of the second configuration comprises two or more of the said plurality of operational cells connected via the said programmable interconnect. Typically the longest critical path of the said second signal processing configuration terminates at a second end-point cell, the method further comprising deriving from the second end-point cell, or from one or more signals transmitted by the second end-point cell, a second trigger signal indicating that signal processing along the longest critical path of the second signal processing configuration is complete, routing the said second trigger signal to the routing circuitry, and implementing a third signal processing configuration comprising one or more third reconfigurable signal processing paths responsive to the said second trigger signal.

It will be understood that the method may comprise repeating this process a number of times, generating third and subsequent trigger signals, and reconfiguring the processor in accordance with fourth and subsequent configurations comprising respective fourth and subsequent reconfigurable signal processing paths, to thereby carry out instructions defined by a computer program. A plurality of successive configurations defined by the (compiled) computer program may be retrievably stored on a non-transitory computer readable medium (e.g. memory such as RAM, ROM or flash memory), the method comprising retrieving the successive configurations in turn from the memory.

One or more of the operational cells are typically 8-bit or greater.

The method may further comprise compiling computer program instructions for implementation on the reconfigurable processor prior to implementing the first configuration, the method comprising: a routing step in which one or more signal processing paths are determined for performing one or more signal processing operations defined by the computer program instructions, each signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step performed subsequent to the routing step in which an extended signal processing path is determined by extending one of the said signal processing paths determined in the routing step such that a critical path of the extended signal processing path is longer than a longest critical path of the signal processing paths determined in the routing step.

The first configuration typically comprises the extended signal processing path and the remaining signal processing paths determined in the routing step (i.e. those reconfigurable signal processing paths determined in the routing step other than the path which was extended in the post-routing step). The longest critical path of the first configuration is typically the said extended signal processing path.

Typically, the method further comprises extending the said signal processing path in the post-routing step such that the critical path of the extended signal processing path terminates at the end-point cell.

The method may further comprise selecting the end-point cell from a plurality of cells of the reconfigurable processor configurable to operate as the end-point cell.

The said plurality of cells configurable to operate as the end-point cell may comprise one or more of the operational cells.

It may be that the plurality of cells configurable to operate as the end-point cell comprise all of the said operational cells. In this case, the method may comprise deriving the trigger signal from the cell at which the critical path of the extended reconfigurable signal processing path terminates, or from signals transmitted by the said cell at which the extended reconfigurable signal processing path terminates, when signal processing along the critical path of the extended signal processing path is complete.

In some embodiments, it may be that one or more of the operational cells are not comprised within the said plurality of cells configurable to operate as the end-point cell.

The method may further comprise a pre-routing step performed prior to the routing step in which a provisional routing configuration is determined based on one or more estimated parameters (e.g. signal propagation delays) of the operational cells and the programmable interconnect.

The plurality of cells configurable to operate as the end-point cell may comprise one or more of the interconnect cells.

The post-routing step may comprise: determining a plurality of possible extended signal processing paths, each of the said plurality of possible extended signal processing paths being determined by extending a respective one of the said signal processing paths determined in the routing step such that its critical path is longer than the longest critical path of the signal processing paths determined in the routing step and such that its critical path terminates at a cell configurable to operate as the end-point cell; and selecting the possible extended signal processing path which comprises the shortest extension of the plurality of possible extended signal processing paths.

A plurality of possible extended signal processing paths may be determined in respect of one or more of the reconfigurable signal processing paths determined in the routing step or in respect of each reconfigurable signal processing path determined in the routing step.

The step of determining the possible extended signal processing paths typically comprises (typically independently) extending the critical paths of the said reconfigurable signal processing paths determined in the routing step. Typically, each of the said plurality of possible extended signal processing paths is determined by (typically independently) extending the critical path of a respective one of the said signal processing paths such that it comprises a critical path which is longer than the longest critical path of the said signal processing paths determined in the routing step and such that the said critical path of the extended signal processing path terminates at a cell configurable to operate as the end-point cell.

It will be understood that the longest critical path of the said signal processing paths determined in the routing step may in some cases terminate at a cell configurable to operate as the end-point cell, in which case the post-routing step may not be required. Thus, the method may comprise: determining whether the longest critical path of the said signal processing paths determined in the routing step terminates at a cell configurable to operate as the end-point cell; and performing the post-routing step responsive to a determination that a longest critical path of the said signal processing paths determined in the routing step does not terminate at a cell configurable to operate as the end-point cell. If the longest critical path terminates at a cell configurable to operate as the end-point cell, the post-routing step may be omitted.

It may be that, excluding a signal processing delay incurred by the end-point cell, the longest critical path has a signal path length equal to that of the critical path of one of the other paths determined in the routing step. In this case, the signal processing delay incurred by the end-point cell provides a "safety margin" which ensures that signal processing along all of the critical paths is complete when signal processing along the longest critical path is complete. Alternatively, it may be that the longest critical path has a longer signal path length than the critical paths of all of the other paths determined in the routing step, excluding the said signal processing delay incurred by the end-point cell. This provides a greater "safety margin" for ensuring that the signal processing along all of the critical paths is complete when signal processing along the longest critical path is complete.

The method may comprise determining which of the critical paths of the paths determined in the routing step is the longest critical path. The method may further comprise: determining that a critical path of the paths determined in the routing step terminates at a cell configurable to operate as the end-point cell; and determining which of the critical paths of the paths determined in the routing step is the longest critical path excluding a signal processing delay of the said cell configurable to operate as the end-point cell. The method may further comprise: determining that a plurality of critical paths of the paths determined in the routing step are of equal length excluding the signal processing delay of the cell configurable to operate as the end-point cell; and selecting the critical path which terminates at the said cell configurable to operate as the end-point cell as the longest critical path.

It may be that the path which is extended in the post-routing step did not comprise the longest critical path of the paths determined in the routing step. Accordingly, it may be that the reconfigurable signal processing path which did not comprise the longest critical path of the paths determined in the routing step is extended to comprise the longest critical path. Alternatively, it may be that the path which comprised the longest critical path of the paths determined in the routing step (said longest critical path of the paths determined in the routing step not terminating at a cell configurable to operate as the end-point cell) was extended such that it terminates at a cell configurable to operate as the end-point cell.

Each of the said one or more signal processing paths typically has a critical path, and the step of extending the said signal processing path typically comprises extending the critical path thereof.

The method may further comprise storing the extended signal processing path in a memory (typically together with the paths determined in the routing step which were not extended in the post-routing step). In this case, the reconfigurable processor can implement the extended (and typically the said non-extended) signal processing path by retrieving the extended signal processing path from the memory and implementing it on its operational cells and interconnect.

The end-point cell may be a dedicated end-point cell. That is, the end-point cell may be a cell which is not used in any reconfigurable signal processing paths implemented on the processor other than at the end of the longest critical path of a particular configuration (i.e. at the end of the critical path of the extended signal processing path). A benefit of employing a dedicated end-point cell is that an existing state of the end-point cell does not need to be preserved.

Alternatively, the end-point cell may be a cell which is used in (e.g. as an operational cell or interconnect cell in a reconfigurable signal processing path of) previous and/or subsequent configurations at (e.g. an intermediate position of) any of the reconfigurable signal processing paths (including both longest critical paths and paths which are not the longest critical paths). Where the end-point cell is intended to be used as an operational or interconnect cell of any of the reconfigurable signal processing paths (including both longest critical paths and paths which are not the longest critical paths) of a previous or subsequent signal processing configuration, the cell may be provided with an "end-point" mode which allows its "normal function" (i.e. its function when not operating as the end-point cell) to be disabled and its current state to be preserved when operated as the end-point cell.

The computer program instructions may be compiled "offline", i.e. independently of the execution of a computer program product implementing the said computer program instructions. In this case, the signal processing paths (including the said extended signal processing path) may be stored in a memory and implemented when the computer program product is executed. Alternatively, the computer program instructions may be compiled when a computer program product implementing the said computer program instructions is executed (e.g. as part of the "loading" process of such a computer program product into fast memory of a computer running the computer program product). In this case, the signal processing paths (including the extended signal processing path) are determined and stored in a memory during execution of such a computer program product.

Although the embodiments of the invention described with reference to the drawings comprise methods performed by computer apparatus, and also computing apparatus, the invention also extends to program instructions, particularly program instructions on or in a computer readable storage medium, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The computer readable storage medium may be any tangible entity or device capable of retrievable storing the program instructions.

A sixth aspect of the invention provides a computer implemented method of compiling computer program instructions for implementation on a reconfigurable processor comprising a plurality of operational cells, each operational cell being connectable to and disconnectable from one or more of the other operational cells via a programmable interconnect, the method comprising: a routing step in which one or more signal processing paths are determined for performing one or more signal processing operations defined by the computer program instructions, each signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step performed subsequent to the routing step in which an extended signal processing path is determined by extending one of the said signal processing paths determined in the routing step such that a critical path of the extended signal processing path is longer than a longest critical path of the signal processing paths determined in the routing step.

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells. Typically, the operational cells of the processor (and the operational cells of one or more or all of the signal processing paths) comprise one or more asynchronous operational cells or the operational cells of the processor (and the operational cells of the signal processing paths) consist of asynchronous operational cells.

A seventh aspect of the invention provides a computer implemented method of operating a reconfigurable processor comprising a plurality of operational cells, each operational cell being connectable to and disconnectable from one or more of the other operational cells via a programmable interconnect, the method comprising: implementing a first signal processing configuration comprising one or more first reconfigurable signal processing paths comprising two or more of the operational cells connected via the programmable interconnect, each signal processing path having a critical path, the longest critical path of the said first signal processing configuration terminating at an end-point cell; processing data along the said reconfigurable signal processing paths of the first signal processing configuration; deriving a trigger signal from the end-point cell, or from one or more signals transmitted by the end-point cell, indicating that signal processing along the said longest critical path is complete; and, responsive to the said trigger signal, reconfiguring the processor in accordance with a second signal processing configuration comprising one or more second reconfigurable signal processing paths (one or more of which are typically different from the said first reconfigurable signal processing paths).

The operational cells of the processor (and optionally the operational cells of one or more or all of the signal processing paths) may comprise one or more asynchronous operational cells. The operational cells of the processor (and optionally the operational cells of one or more or all of the signal processing paths) may comprise one or more synchronous operational cells. The operational cells of the processor may consist of asynchronous operational cells. The operational cells of one or more or all of the signal processing paths may consist of asynchronous operational cells. Alternatively, the operational cells of the processor may consist of synchronous operational cells. The operational cells of one or more or all of the signal processing paths may consist of synchronous operational cells. Typically, the operational cells of the processor (and the operational cells of one or more or all of the signal processing paths) comprise one or more asynchronous operational cells or the operational cells of the processor (and the operational cells of the signal processing paths) consist of asynchronous operational cells.

An eighth aspect of the invention provides a non-transitory computer readable medium retrievably storing computer readable code for causing a computer to perform the method according to the first or fifth aspects of the invention or the computer implemented method according to the sixth or seventh aspects of the invention.

It will be understood that the term "non-transitory computer-readable medium" comprises all computer-readable media, with the sole exception being a transitory, propagating signal. For example, the non-transitory computer readable medium may be a memory, such as a Random Access Memory (RAM), a Read Only Memory (ROM), for example a CD ROM or a semiconductor ROM, or a magnetic recording medium, for example a floppy disc or hard disc.

A ninth aspect of the invention provides a computer configured to perform the computer implemented method of the sixth or seventh aspects of the invention.

A tenth aspect of the invention provides a computing device comprising a processor in electronic communication with a non-transitory computer readable medium storing computer readable code which when executed by the processor causes the computing device to function as the compiler according to the second aspect of the invention.

The preferred and optional features discussed above are preferred and optional features of each aspect of the invention to which they are applicable. For the avoidance of doubt, the preferred and optional features of each aspect of the invention are also preferred and optional features of all of the other aspects of the invention, where applicable.

DESCRIPTION OF THE DRAWINGS

An example embodiment of the present invention will now be illustrated with reference to the following Figures in which:

FIG. 1b is a schematic view of the reconfigurable processor of FIG. 1a in which a second signal processing configuration has been implemented comprising three signal processing paths different from the two signal processing paths of FIG. 1a;

DETAILED DESCRIPTION OF AN EXAMPLE EMBODIMENT

Figure 1C:
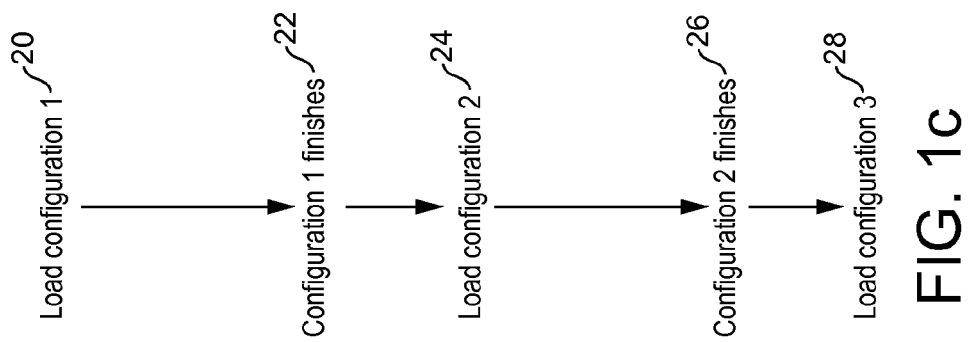
FIG. 1c is a flow chart illustrating a procedure followed by the processor of FIGS. 1a and 1b to implement the signal processing paths.
Figure 1A:
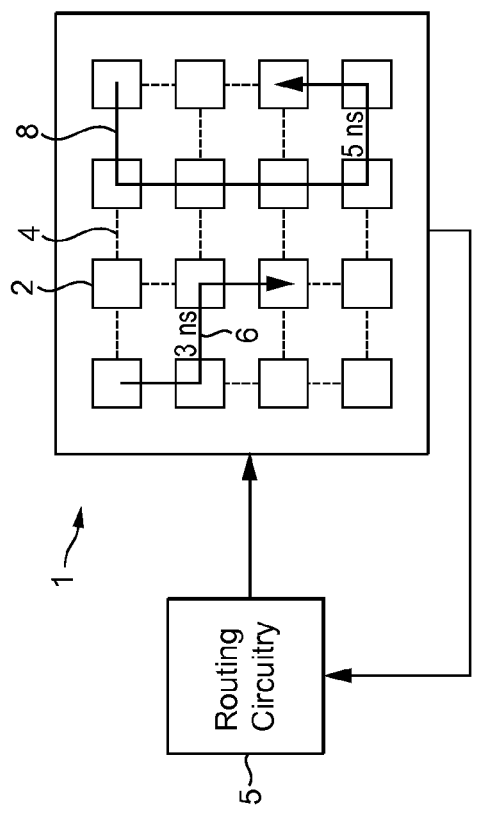
FIG. 1a is a schematic view of a reconfigurable processor in which a first signal processing configuration has been implemented comprising two reconfigurable signal processing paths.
Figure 1B:
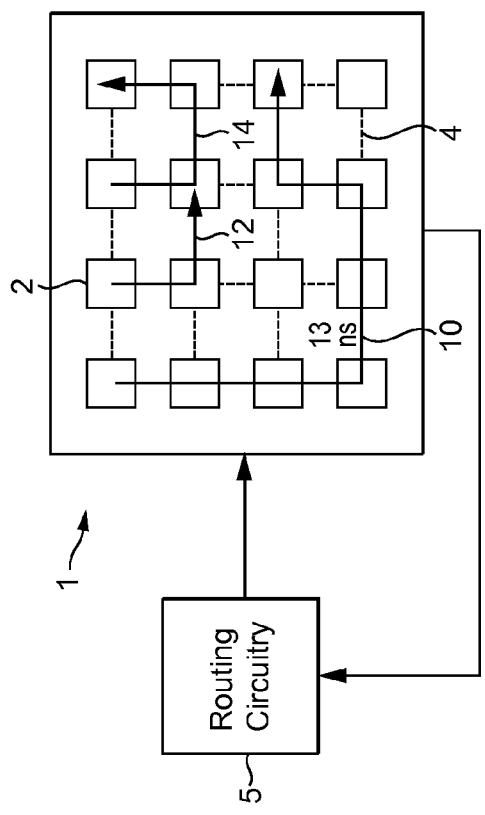

FIGS. 1a and 1b show a dynamically reconfigurable microprocessor 1 comprising a 4×4 grid of asynchronous operational cells 2 (e.g. arithmetic logic units) each of which is connectable to and disconnectable from the other operational cells 2 via a programmable (typically asynchronous or combinatorial) interconnect 4 (which, it will be understood, comprises a plurality of electronic connections each of which extends between an adjacent pair of operational cells and which can be programmed to an "on" state in which they conduct electronic signals or an "off" state in which they do not conduct electronic signals). The reconfigurable microprocessor 1 also comprises routing circuitry 5 in electronic communication with the operational cells 2 and the programmable interconnect 4. The routing circuitry 5 is configured to implement reconfigurable signal processing paths in the microprocessor 1 by programming the interconnect 4 to connect appropriate operational cells 2 together, and to set one or more parameters of the operational cells accordingly where appropriate, for the performance of particular signal processing operations.

As explained in more detail in the example below with reference to FIGS. 8-12, each of the signal processing paths may comprise a plurality of data flow paths, each data flow path comprising a plurality of operational cells electronically connected by electronic connections of the interconnect 4 programmed to the "on" state. It is typical to define the critical path of each of the signal processing paths as the longest data flow path of that respective signal processing path (i.e. the data flow path which incurs the longest (electronic) signal processing time, including signal propagation delays, settling time and processing by the operational cells).

In FIG. 1a, the routing circuitry 5 is configured to implement a first configuration comprising two reconfigurable signal processing paths, the respective critical paths 6, 8 of which are shown. In FIG. 1b the routing circuitry 5 is configured to implement a second configuration comprising three different reconfigurable signal processing paths, the respective critical paths 10, 12, 14 of which are shown. In both FIGS. 1a and 1b, the signal processing paths of each configuration are configured to process signals in parallel.

It is also useful to define a "longest critical path" of a particular configuration, the longest critical path being the longest critical path of that configuration. Accordingly, when signal processing along the longest critical path of a particular configuration is complete, signal processing along all of the signal processing paths of a particular configuration will typically be complete. In the examples of FIGS. 1a and 1b, the longest critical paths are critical paths 8 and 10 respectively.

FIG. 1c is a flow-chart describing the outline of an operating procedure of the reconfigurable microprocessor 1 implemented by the routing circuitry 5. The first configuration (shown in FIG. 1a) comprising signal processing paths having respective critical paths 6, 8 is first implemented in step 20. Next, signal processing is performed along each path 6, 8 in parallel. After an appropriate signal processing and signal settling time, signal processing along all of the signal processing paths of the first configuration is deemed to be completed at step 22. Next, the second configuration comprising reconfigurable signal processing paths having respective critical paths 10, 12,14 is implemented in step 24. Signal processing is then performed along each path in parallel. After an appropriate signal processing and signal settling time, signal processing by the second configuration is deemed to be completed at step 26. A further set of reconfigurable signal processing paths is implemented at step 28 and so on.

As explained in the Background section above, the routing circuitry 5 may be configured to load each new configuration 20, 24, 28 responsive to a global clock signal. However, this incurs delays between the completion of signal processing along the signal processing paths of the implemented configuration and the occurrence of the next clock signal. The slower the clock, the greater the delay. Accordingly, in this case, a global clock is omitted and a different way of triggering the routing circuitry to implement new reconfigurable signal processing paths is employed as described below.

When signal processing is performed along a particular signal processing path, handshaking request signals are typically transmitted from one operational cell to the next operational cell along the path (and from the routing circuitry 5 to the first cell in the path). When signal processing by a particular operational cell is complete, that operational cell transmits a handshaking acknowledgement signal indicating that it is available to receive new data (and thus available for use in a new configuration). Accordingly, by monitoring an output port of the last operational cell in the longest critical path of a particular configuration for a handshaking acknowledgement signal indicating that it is available to receive new data (and thus available for use in a new configuration), it can be determined when signal processing by a particular configuration is complete.

Figure 2:
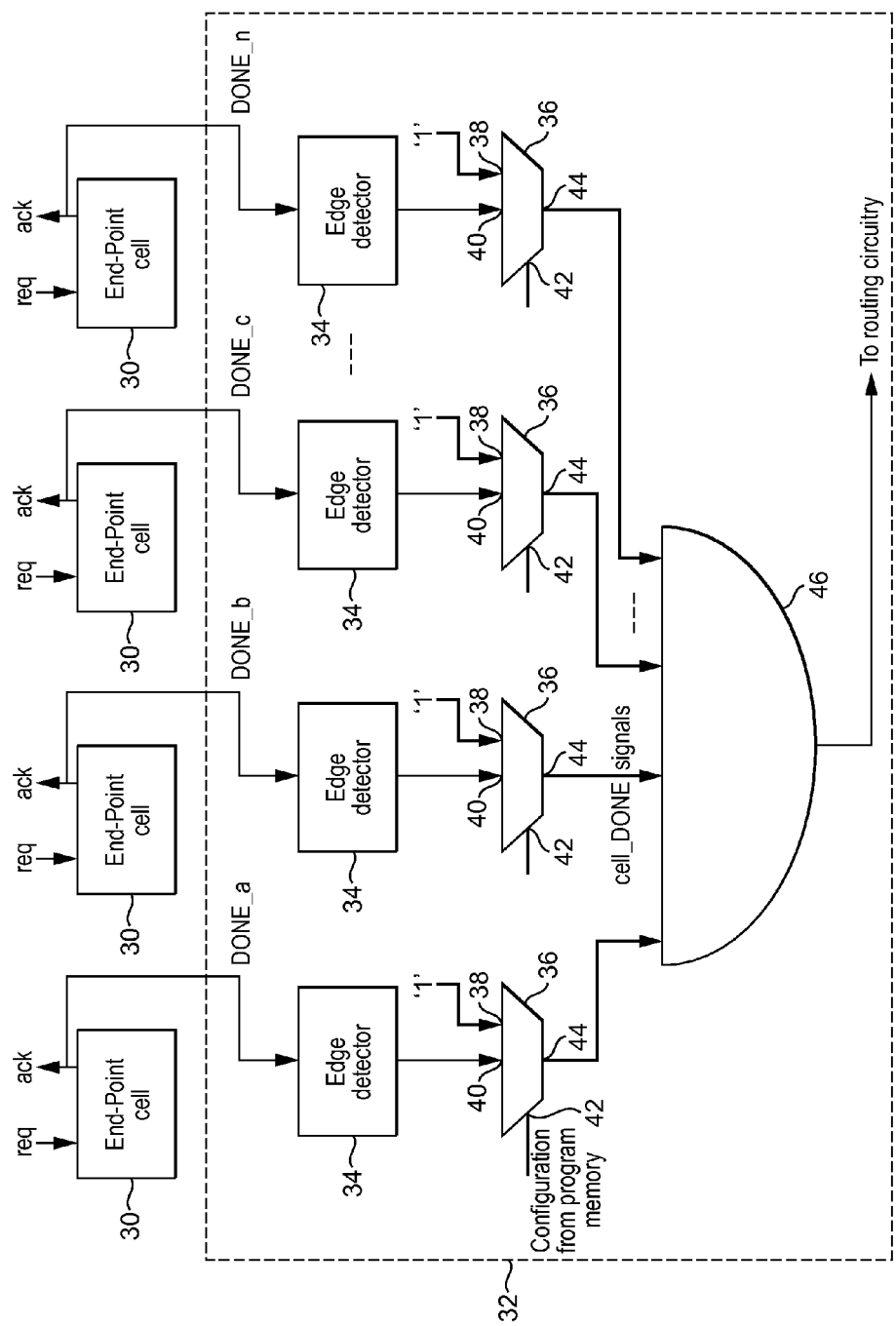
FIG. 2 is a schematic view of the reconfigurable processor of FIGS. 1a, 1b comprising a plurality of cells configurable to operate as an end-point cell from which a trigger signal can be derived to trigger the implementation of a new signal processing configuration.
Figure 3:
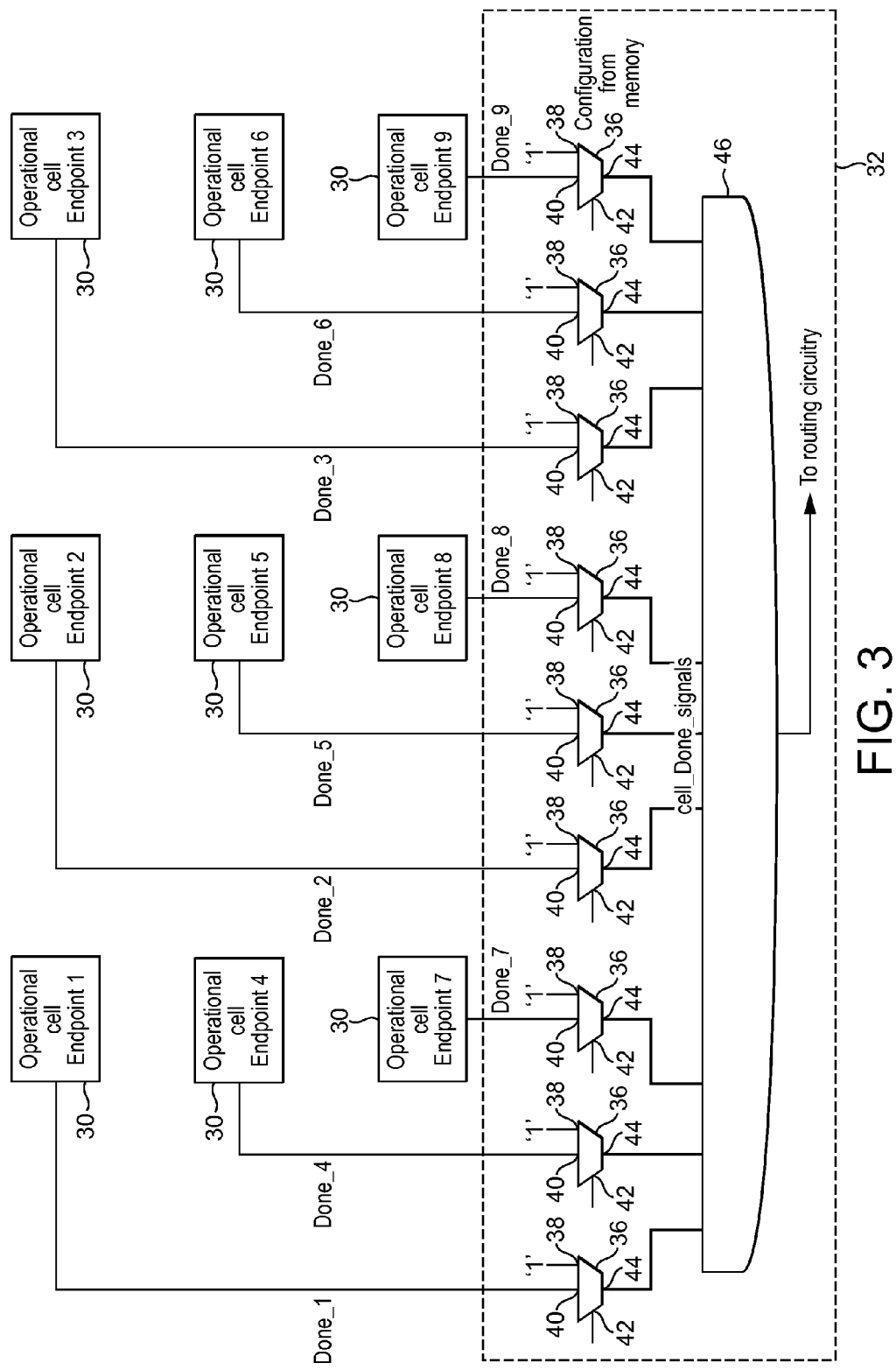
FIG. 3 is a schematic view of the reconfigurable processor of FIGS. 1a, 1b showing additional cells configurable to operate as the end-point cell over the view of FIG. 2.
Figure 4:
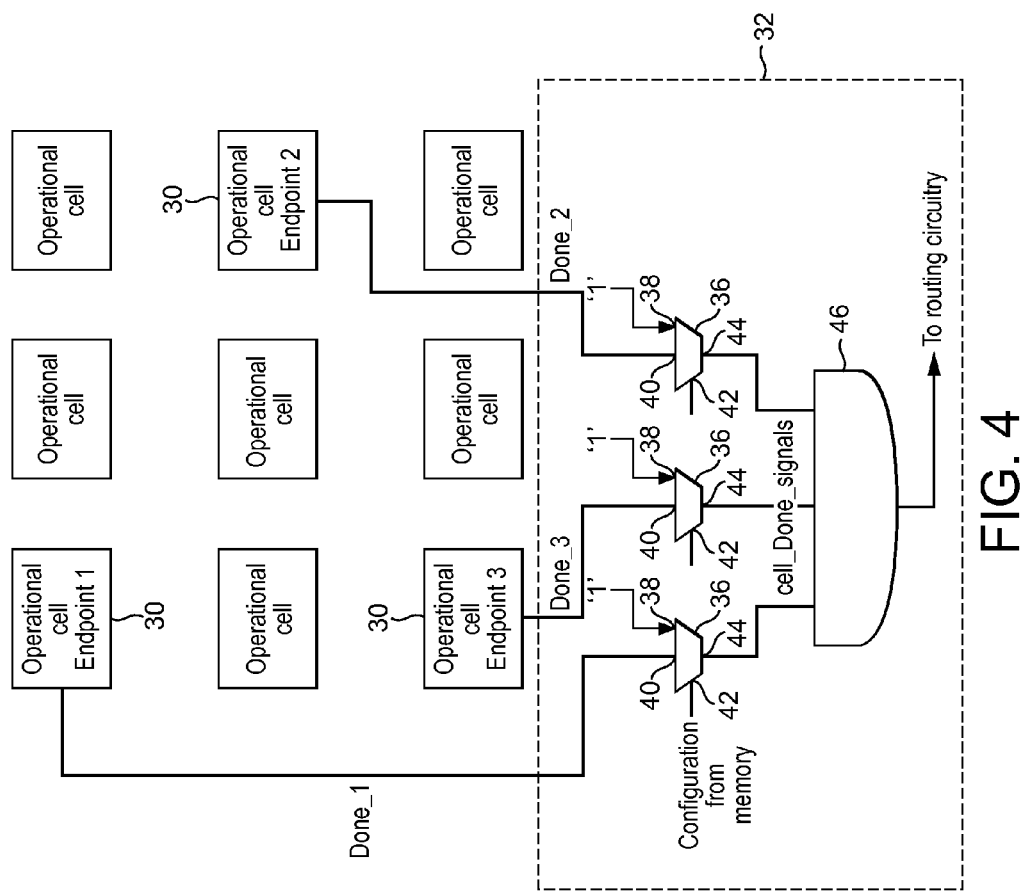
FIG. 4 is a schematic view of an alternative reconfigurable processor in which only some of the operational cells are configurable to operate as the end-point cell.

As illustrated in FIGS. 2-4, the longest critical path of each configuration terminates at a cell 30 configured to operate as the "end-point" cell. Ways in which this can be achieved are explained below. As illustrated in FIG. 3, it may be that every operational cell of the array is configurable to operate as the end-point cell. Alternatively, as illustrated in FIG. 4, it may be that only a subset of the operational cells of the array less than the total number of operational cells in the array is configurable to operate as the end-point cell.

Each operational cell configurable to operate as the end-point cell is in electronic communication with the routing circuitry 5 via a feedback loop comprising trigger signal derivation circuitry 32. The trigger signal derivation circuitry 32 comprises a plurality of edge detectors 34 each electronically connected between a respective cell 30 configurable to operate as the end-point cell and a respective multiplexer 36. The edge detectors 34 are connected to the output port (or a conductor extending therefrom) of the respective cell 30 such that they can detect a rising edge (or falling edge as the case may be) caused when the cell 30 transmits a handshaking acknowledgement signal indicating that it is available to receive new data (and thus available for use in a new configuration).

Each of the multiplexers 36 has three inputs: a first input 38 which is configured to receive a logic '1'; a second input 40 receiving the output from an edge detector 34; and a third input 42 receiving a configuration signal from the routing circuitry 5. The configuration signal input to the third input 42 selects the multiplexer 36 connected to the cell 30 at which the longest critical path terminates (i.e. the end-point cell). The selected multiplexer 36 is configured to output the signal it receives from the respective edge detector 34. The multiplexers 36 which are not selected by the configuration signal are configured to output the logic '1' they receive from their first input 38. The multiplexers 36 each have an output 44 connected to a respective input of a multi-input logic AND gate 46 (or a tree of AND gates).

When the output of the selected multiplexer 36 is a logic '1', the output of the AND gate is a logic '1' because the outputs of the non-selected multiplexers output logic '1' by default. Conversely, when the output of the selected multiplexer 36 is a logic '0', the output of the AND gate is a logic '0'. Since the output of the selected multiplexer 36 depends on the output of the corresponding edge detector 34, a logic '1' or a logic '0' (depending on the implementation) can be triggered at the output of the AND gate 46 when the handshaking acknowledgement signal is transmitted.

The output of the AND gate 46 is transmitted to the routing circuitry 5. The routing circuitry 5 is configured to implement a new configuration comprising one or (typically) more reconfigurable signal processing paths responsive to the output of the AND gate changing (e.g. from a logic '0' to a logic '1' or vice versa). More specifically, the routing circuitry 5 is configured to implement a new configuration directly responsive (i.e. without waiting for any other trigger events, such as clock cycles) to the output of the AND gate changing. Accordingly, when the signal output by the AND gate 46 is indicative of a handshaking acknowledgement signal being transmitted by the end-point cell 30, the signal output by the AND gate acts as a trigger signal (directly) causing the routing circuitry 5 to implement a new configuration. In this way, new configurations can be implemented almost immediately after signal processing by the current configuration is complete. This avoids delays incurred by having to wait for a subsequent global clock signal to trigger the routing circuitry to implement the next configuration, which improves the efficiency of the processor and the speed at which it can operate.

Figure 5:
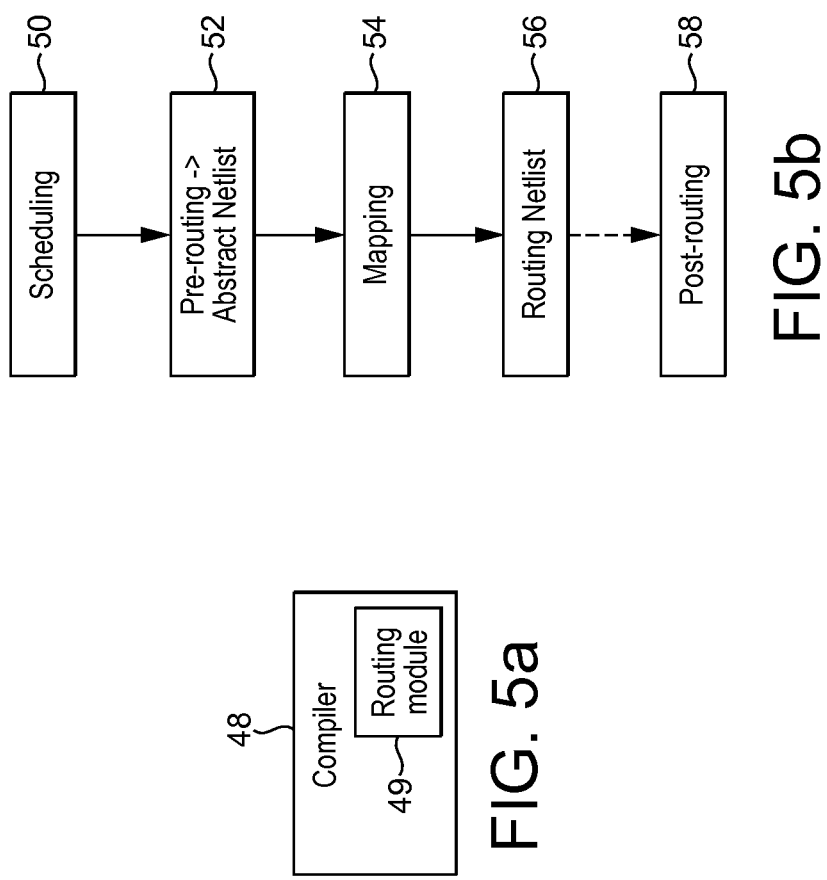
FIG. 5a is a block diagram of a compiler comprising a routing module.
FIG. 5b is a flowchart describing a method implemented by the routing module of the compiler of FIG. 5b to determine the signal processing paths of a signal processing configuration to be implemented on the processor of FIG. 1a, b.

A block diagram of a compiler 48 comprising a routing module 49 is shown in FIG. 5a. The way in which the routing module 49 of the compiler 48 determines the signal processing paths of each signal processing configuration for implementation on the processor 1 is now explained with reference to FIG. 5b. In a first method of determining the signal processing paths of a signal processing configuration, only the first four steps of FIG. 5b are performed. In a first step 50, the routing module 48 derives signal processing operations to be performed by the processor 1 from corresponding computer program instructions and schedules them in an operating order. In a second, pre-routing step 52, the routing module 49 determines an abstract netlist defining a draft signal processing configuration to be implemented by the processor 1. The abstract netlist is determined based on estimates of the timing of signal processing by the operational cells 2, signal propagation along the interconnect 4 and signal settling time. It is not typically possible to directly translate the abstract netlist into a bit stream for loading onto the processor 1 because it does not describe the required state of the interconnect for implementation of the signal processing configuration, only which cells should be connected to each other to form the configuration. The routing module 49 then maps the abstract netlist in a mapping stage (or "routing step") 54 to yield a routed netlist 56, the routed netlist defining how the cells should be connected via the interconnect. In the mapping stage 54, the constraints on the available interconnect 4 are observed such that the routed netlist 56 can be directly translated into a bit stream for loading onto the processor 1. As explained below with reference to FIG. 7, an alternative method of determining the signal processing paths of the signal processing configuration may be employed comprising the first four steps of FIG. 5b and further comprising a post-routing step 58.

As indicated above, it may be that every operational cell is configurable to operate as the end-point cell (see FIGS. 2 and 3). However, particularly for larger arrays, the overhead in size and complexity of the trigger signal derivation circuitry 32 can be significant and even prohibitive. Having large and complex trigger signal derivation circuitry 32 can also incur significant signal propagation delays, which can make the processor 1 less efficient and less quick at processing data. Accordingly, it is typically beneficial for only a subset of the operational cells 2 less than the total number of operational cells 2 to be configurable to operate as the end-point cell. It can be readily seen by comparing FIGS. 3 and 4 that this significantly reduces the size and complexity of the trigger signal derivation circuitry 32. For example, for a 20×20 array of operational cells 30, there may be 10 designated cells configurable to operate as the end-point cell. This improves the scalability of the architecture.

Figure 6:
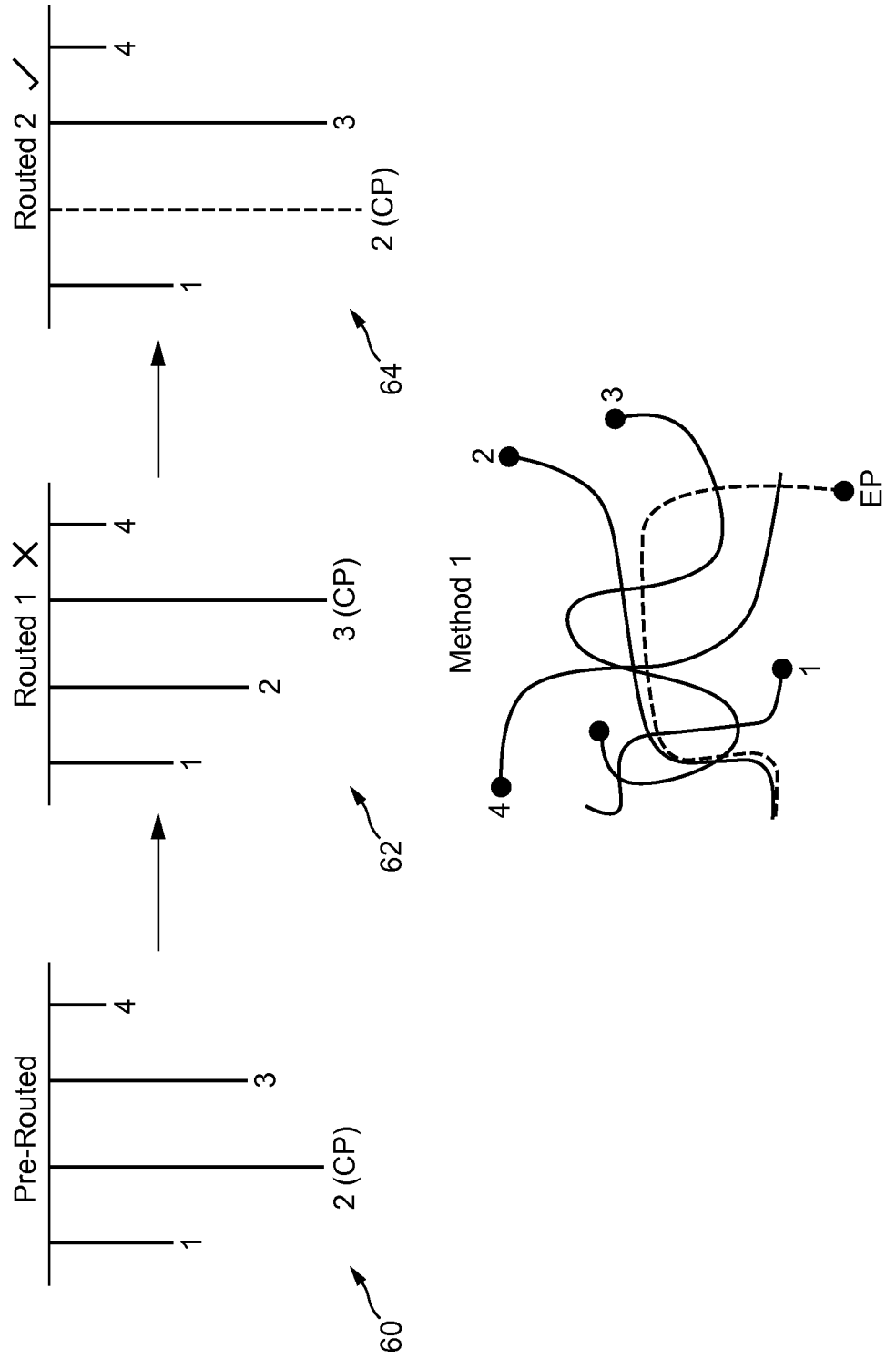
FIG. 6 shows an exemplary implementation of the first four steps of the method of FIG. 5b in which (invalidly) the longest critical path of the configuration following routing does not terminate at a cell configurable to operate as the end-point cell and which requires re-routing such that the longest critical path of the configuration does terminate at a cell configurable to operate as the end-point cell.

The individual path delays of the routed netlist often differ considerably from the estimates used in the abstract netlist. Accordingly, as illustrated in FIG. 6 where the first method of determining the signal processing paths of the signal processing configuration (comprising only the first four steps of FIG. 5b) is employed, it may be that the signal processing path comprising the longest critical path 2 from the abstract netlist 60 no longer comprises the longest critical path in the routed netlist 62. More specifically, in the example of FIG. 6, the longest critical path of the (pre-routed) abstract netlist is path 2 while the longest critical path of the routed netlist 62 is path 3. The routing algorithm may be adapted to ensure that the longest critical path 2 from the abstract netlist terminates at a cell configurable to operate as the end-point cell. However, this would require the routing algorithm to select the longest critical path from the abstract netlist, ensure that it remains the longest critical path in the routed netlist, and ensure that it terminates at a cell configurable to operate as the end-point cell. This would be difficult and complicated (although not impossible), and would put a significant signal processing burden on the mapping stage 54.

Particularly for larger arrays, the number of cells 30 configurable to operate as the end-point cell may be increased to alleviate this burden, but this of course has the disadvantages of increasing the size and complexity of the trigger derivation circuitry 32 and increasing signal propagation delays as explained above. Accordingly, in the absence of another solution, these factors could reduce the scalability of the architecture.

Figure 7:
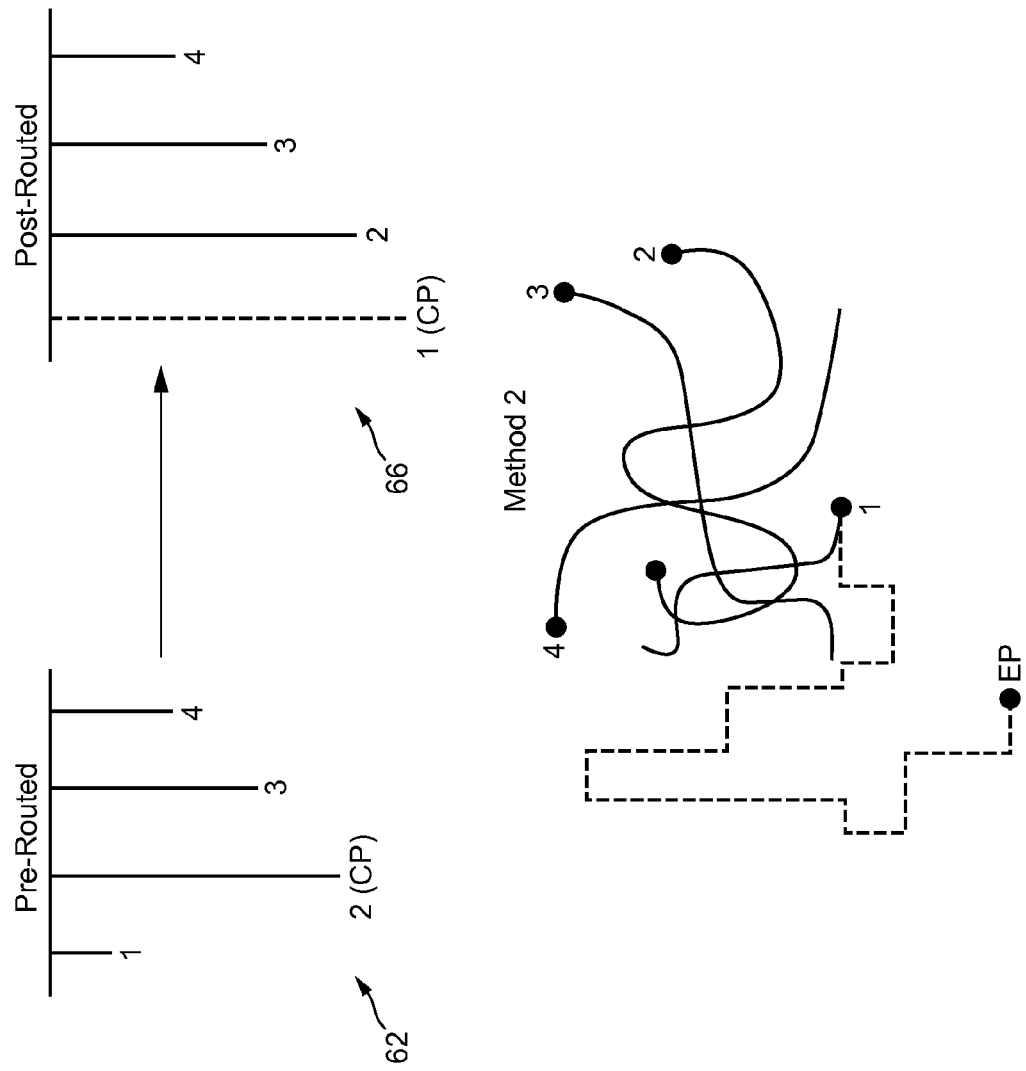
FIG. 7 illustrates an alternative method of determining the signal processing paths of a signal processing configuration comprising a fifth, post-routing step in addition to the four steps of the method illustrated by FIG. 6 (excluding the re-routing step), one of the paths of the configuration being extended in the post-routing step to become the longest critical path and to terminate at a cell configurable to operate as the end-point cell.

In the example of FIG. 7, the routing module 49 performs the alternative method of determining the signal processing paths of the signal processing configuration, comprising all five steps of FIG. 5b including the additional post-routing step 58. It will be understood that, in the example of FIG. 7, only a subset of the operational cells less than the total number of operational cells are configurable to operate as the end-point cell. The post-routing step 58 is employed by the compiler to ensure that the longest critical path of a particular configuration terminates at a cell configurable to operate as the end-point cell. Accordingly, the abstract and routed netlists may be derived by the compiler without concern for whether the longest critical path changes between the abstract and routed netlists and without concern for whether the longest critical path terminates at a cell configurable to operate as an end-point cell. In the post-routing step 58, which is performed by the compiler subsequent to the routing step in which the routed netlist is derived, it is determined which critical path is the longest critical path and whether it terminates at a cell configurable to operate as the end-point cell. If the longest critical path does terminate at a cell configurable to operate as the end-point cell, no further routing is performed and the cell at which the longest critical path terminates is selected as the end-point cell. If the longest critical path does not terminate at a cell configurable to operate as the end-point cell, one of the signal processing paths (which may or may not be the longest critical path from the routed netlist and/or the abstract netlist) is extended such that it comprises the longest critical path of the configuration and that the said longest critical path terminates at a cell configurable to operate as the end-point cell. Typically, the extension of each signal processing path is considered, and the path which requires the shortest extension to comprise the longest critical path terminating at a cell configurable to operate as the end-point cell is selected to be extended in the post-routing step 58. Typically, the extension of the existing critical paths of the signal processing paths is considered in the post-routing step.

A possible implementation of the post-routing step 58 can be illustrated by the following pseudo-code (following the generation of the routing netlist):

```
Identify longest critical path of the routed netlist;
Does longest critical path terminate at the end-point cell?
    Yes -> finished
    No:
        For each unconnected cell configurable to operate as the end-
        point cell 'E':
            Search NxN cells in the matrix surrounding E for a cell
            'A' at which an active (typically critical) data path 'D'
            terminates
            For each cell 'A'
                Search for paths 'P' between E and A;
                For each path 'P' that extends 'D' by enough to
                become the longest critical path:
                    Record P in map 'Q';
                    Store the amount by which P extends
                    the longest critical path;
                end For
            End For
        Select from Q the item P which extends the longest critical
        path by the shortest amount;
        Commit change P
    End.
```

In the example of FIG. 7, the longest critical path in the routed netlist 62 is the critical path 2. However, in the post-routing step 58, it is the critical path 1 which is extended to become the longest critical path terminating at a cell configurable to operate as the end-point cell. Accordingly, in the post-routing netlist 66, the critical path 1 is the longest critical path.

The post-routing step 58 allows the number of cells configurable to operate as the end-point cell to be kept low because any of the critical paths from the routed netlist can be extended to terminate at such a cell (as opposed to the longest critical path from the abstract netlist having to be extended to terminate at such a cell). This helps the architecture to become more scalable because the overhead on the routing algorithm is reduced, and the signal propagation delay, complexity and added footprint incurred by the trigger signal derivation circuitry can also be kept low.

The compiler proceeds to store on a computer readable medium a configuration comprising the extended signal processing path determined in the post routing step 58 and the other signal processing paths determined in the routing step which were not extended in the post-routing step 58. The determined configuration can then be implemented by the processor 1 when it is brought into electronic communication with the computer readable medium storing the configuration.

It will be understood that in an architecture with asynchronous (implicitly pipelined) interconnect cells such as interconnect registers or switch-boxes, particular interconnect cells can be configurable to operate as the end-point cell. Accordingly, the critical path of any data path can be extended by running additional interconnect from the last cell in the datapath to one of the switch-boxes configurable to operate as the end-point cell. This may be preferable in some circumstances to employing an operational cell 2 as the end-point cell because the need to alter values stored in otherwise inactive registers is avoided.

It will also be understood that in an architecture with non-pipelined interconnect, the interconnect is typically unable to perform handshaking, and hence operate as the end-point cell. In this case, one of the operational cells 2 typically operates as the end-point cell in each configuration.

The end-point cell can either be a dedicated end-point cell or a multi-purpose cell which can otherwise be used by the processor, for example at an intermediate portion of a non-critical or critical path. The disadvantage of designating a multi-purpose cell as the end-point cell is that it must become active when it is being used as the end-point cell, where its state may be altered unintentionally. In order to avoid such unintentional state changes, additional pressure may need to be put on the routing algorithm. Accordingly, it may be preferable to employ dedicated cells configurable to operate as the end-point cell, and which are not typically used unless performing as the end-point cell. This may be achieved by configuring the compiler to use dedicated end-point cells as end-point cells only. Alternatively, multi-purpose cells capable of performing as the end-point cell may be provided with an additional "end-point" mode, allowing their "normal" function (i.e. their function if being used in a signal processing path other than as the end-point cell) to be suspended, and their state to be preserved when operating in end-point mode.

A worked example of how the routing module 49 of the compiler 48 determines signal processing configurations is described below.

EXAMPLE

Figure 8:
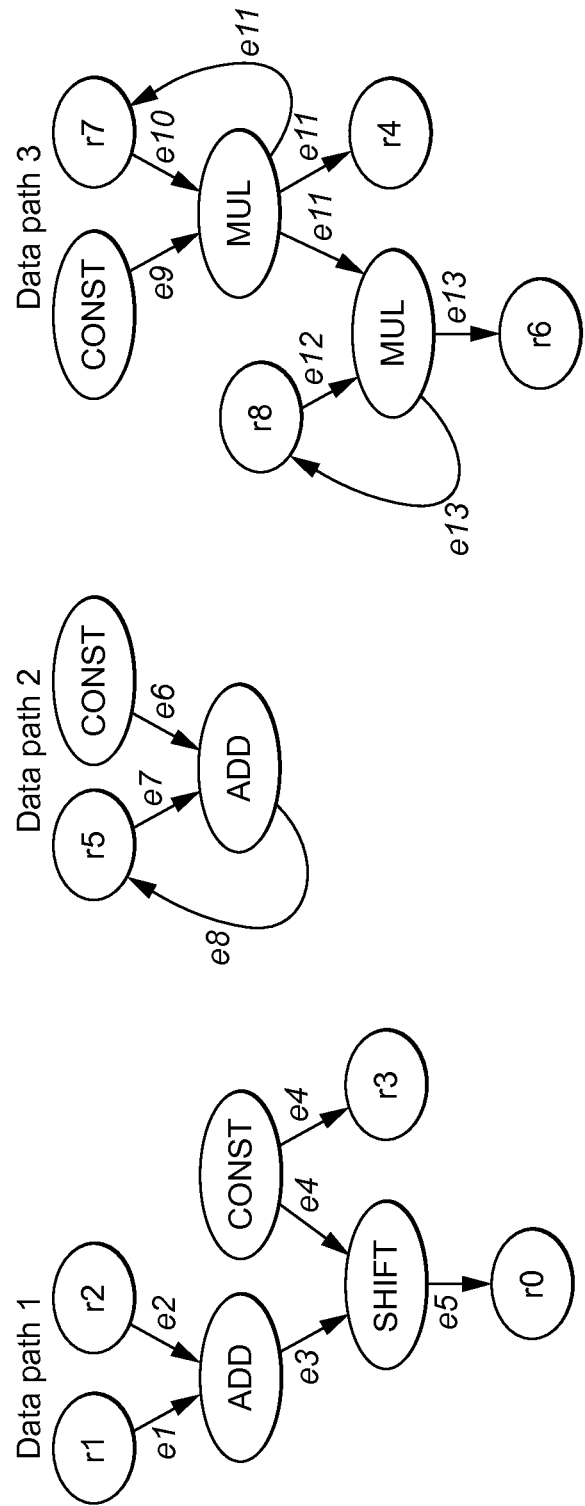
FIGS. 8-12 illustrate a worked example of an embodiment of the invention, FIG. 8 illustrating three signal processing paths of a signal processing configuration, and FIGS. 9-12 illustrating implementations of the signal processing paths and variations thereof on the reconfigurable processor.
Figure 9:
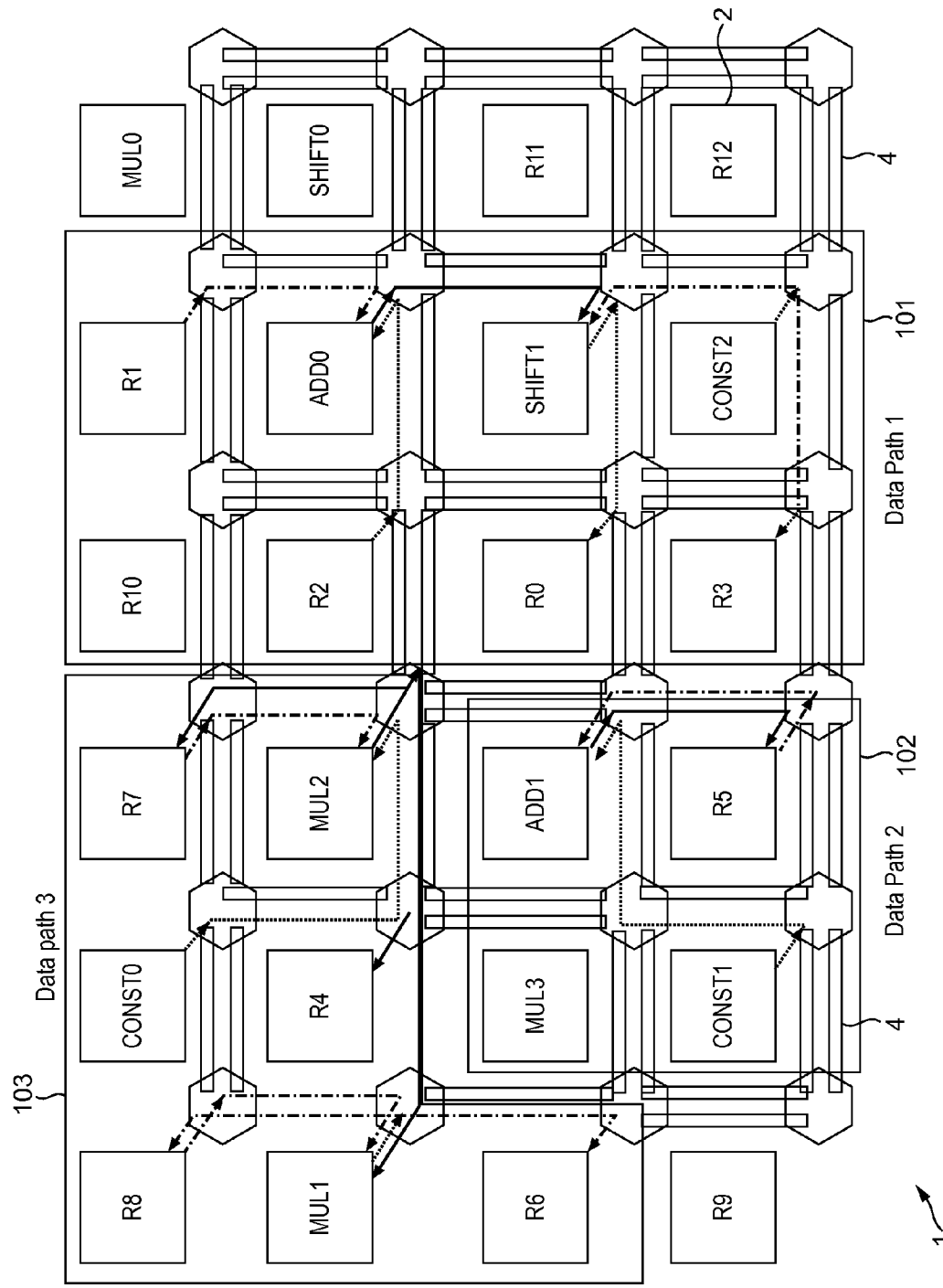
Figure 10:
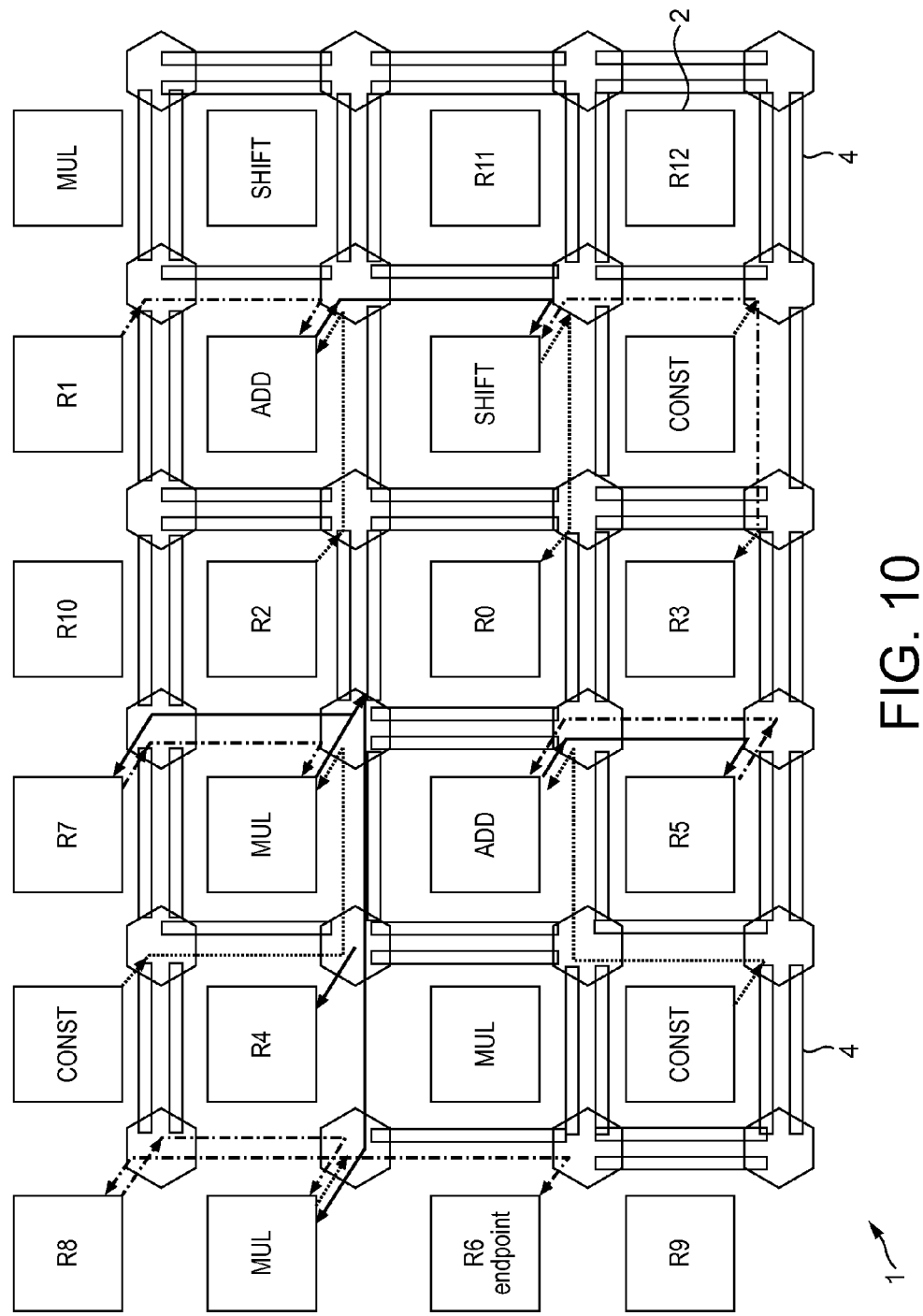

FIG. 8 illustrates three signal processing paths—path 1, path 2 and path 3—from a routing netlist of a particular signal processing configuration determined by the routing module 49 of the compiler 48. FIG. 9 illustrates in dotted and bold lines within labelled boxes 101, 102 and 103 respectively the three signal processing paths 1, 2 and 3 mapped onto the processor array of operational cells 2 (of which a 6×4 array is shown) and the interconnect 4 (which interconnect 4, as shown, comprises a grid of programmable horizontal and vertical electronic connections extending between the operational cells of the array and a switch-box at each of the intersections between the horizontal and vertical programmable electronic connections). Each signal processing path 1, 2 and 3 has a critical path. The critical path of signal processing path 1 is:
R1->ADD0->SHIFT1->R0

The critical path of signal processing path 2 is:
CONST1->ADD1

The critical path of signal processing path 3 is:
CONST0->MUL2->MUL1->R6

From the routing netlist, it is determined by the routing module 49 that the longest critical path is the critical path of signal processing path 3. Following determination of the longest critical path, the routing module 49 determines whether the longest critical path terminates in a cell configurable to operate as the end-point cell. In this case, the longest critical path terminates at R6, so the routing module 49 determines whether R6 is configurable to operate as the end-point cell. The locations of cells configurable to operate as the end-point cell are typically fixed on the array and they may be stored in and read from a configuration file or "built-in" to (or "embedded in") a processor memory. If it is determined that R6 is configurable to operate as the end-point cell, the routing module 49 implements the signal processing paths 1, 2 and 3 in accordance with the routed netlist (see FIG. 10).

Figure 11:
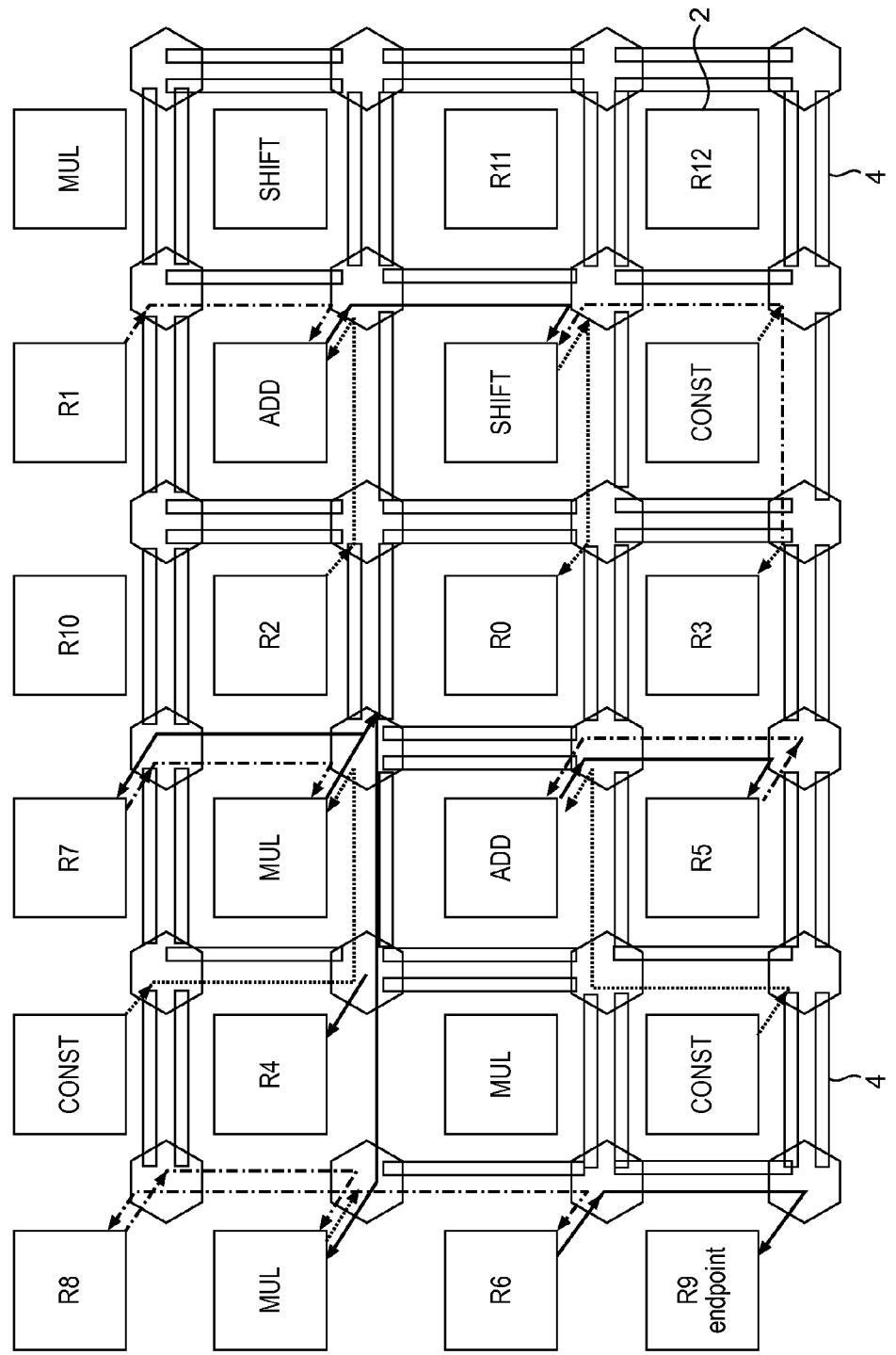
Figure 12:
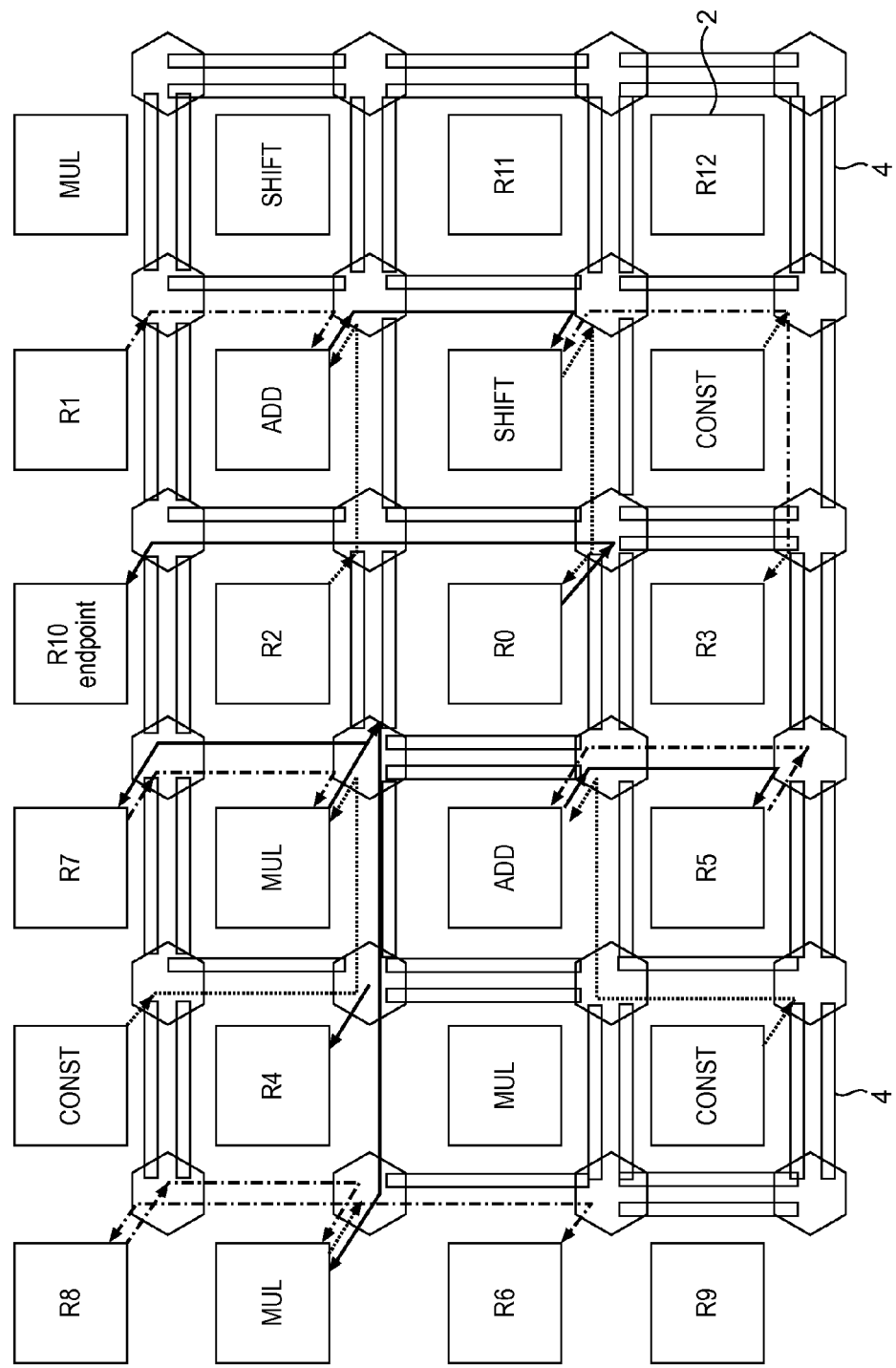

If it is determined that R6 is not configurable to operate as the end-point cell, the post-routing step 58 is performed by the routing module 49 to extend one of the critical paths of the routed netlist such that it is the longest critical path terminating at a cell configurable to operate as the end-point cell. More specifically, as outlined above, the post-routing step 58 involves searching for all paths between a plurality of empty cells configurable to operate as the end-point cell and the cells at which the critical paths of each of the first, second and third signal processing paths of the routed netlist terminate. The extended critical path which requires the shortest extension to both be the longest critical path and terminate at a cell configurable to operate as the end-point cell is selected by the routing module 49 for extension and extended. The signal processing paths of the routed netlist together with the extended critical path are then implemented in the array. In the example of FIG. 11, the critical path of signal processing path 3 is extended to cell R9 which becomes the end-point cell. In this case, the critical path of signal processing path 3 remains the longest critical path after the post-routing step 58. In an alternative implementation shown in FIG. 12, the critical path of signal processing path 1 is extended to become the longest critical path terminating at end-point cell R10.

Accordingly, it may be that the longest critical path of the routed netlist is extended during post routing; alternatively, it may be that a path of the routed netlist other than the longest critical path is extended during the post routing step 58.

The configuration determined by the routing module 49 comprising the extended signal processing path and the non-extended signal processing paths from the routed netlist is then stored in a memory for subsequent implementation by the processor.

In use, the processor implements the configuration stored on the memory. A trigger signal is then derived from the handshaking acknowledgement signal transmitted by the end-point cell (i.e. R9 or R10 in the above examples) when processing along the critical path of the extended signal processing path is complete before being fed back to the routing circuitry 5 of the processor 1. The routing circuitry 5 may then implement a new configuration on the processor, the new configuration comprising a new set of signal processing paths on the processor array responsive to the trigger signal in place of the first configuration. It will be understood that the new set of signal processing paths may also be obtained from the memory, having previously been determined by the routing module 49 of the compiler 48 in the manner described above.

It will be understood that the new configuration need not be different from the current configuration, in which case the new configuration need not be obtained from the memory. In this case, the "new configuration" implemented by the processor responsive to the trigger signal is a new iteration of the same signal processing paths (which are now processing different signals). Since the time required to obtain a new configuration from memory and implement it on the processor is typically greater than the time taken for signal processing by that configuration to be executed (completed), the processor can operate even more quickly when it is not required to load a different configuration.

The solution described above is widely applicable, and is operable on all asynchronous dynamically reconfigurable designs including dual rail, two phase or four phase handshaking. It also works on architectures with implicitly pipelined (i.e. interconnect contain latches), non-pipelined (i.e. interconnect do not contain latches) or explicitly pipelined (i.e. external registers are used for pipelining) interconnect structures.

It will also be understood that the array of operational cells 2 may be split up into zones of operational cells 2, each zone being treated separately from the others. The routing circuitry 5 may be configured to implement a first configuration at a first zone, a second configuration at a second zone and so on. In this case, it is preferable for separate trigger signal derivation circuitry 32 to be provided for each zone. New configurations are typically implemented at each zone independently of the other zones in response to trigger signals derived by the trigger signal derivation circuitry 32 associated with that particular zone. It is also preferable for dedicated cells capable of performing as the end-point cell to be provided for each respective zone independently of the other zones.

In an alternative embodiment, one or more (or even all of) the operational cells are synchronous operational cells which operate with reference to a global clock (which is typically provided in communication with the routing circuitry). For a configuration comprising synchronous operational cells, a new signal processing configuration may be implemented on the next clock cycle following the time at which signal processing by the existing configuration is complete. The time (and therefore the number of clock cycles) for signal processing to be completed by a particular configuration (including settling time) is computed based on expected timing delays incurred by the operational cells and interconnect of the configuration. It is typical that a "safety margin" is built in to the expected timings to account for "worst case scenario" voltage fluctuations. In addition, if the processor is to operate over a wide range of environmental conditions (e.g. temperatures), the effects of ambient temperature variations over that range are also typically accounted for in the expected timings. This can lead to accounting for delays that are greater than required, unnecessarily slowing down the operation of the processor. However, in accordance with the present invention, the trigger signal derived from the end-point cell can be used to determine a time at which signal processing by a particular configuration is complete. More specifically, the routing circuitry may be configured to implement a new configuration on the next clock cycle (a further trigger event) following receipt of the trigger signal. Thus, in cases other than the worst case scenarios envisaged in the expected timings, implementation of subsequent configurations can occur more quickly, thereby increasing the speed of the processor.

Accordingly, the trigger signal provides automatic compensation for delay changes resulting from voltage fluctuations or temperature variations.

Further modifications and variations may be made within the scope of the invention herein disclosed.

The invention claimed is:

1. A method of compiling computer program instructions for implementation on a reconfigurable processor comprising a plurality of operational cells, each operational cell being connectable to and disconnectable from one or more of the other operational cells via a programmable interconnect, the method comprising: a routing step in which one or more signal processing paths are determined for performing one or more signal processing operations defined by the computer program instructions, each signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step performed subsequent to the routing step in which an extended signal processing path is determined by extending one of the said signal processing paths determined in the routing step such that a critical path of the extended signal processing path is longer than a longest critical path of the signal processing paths determined in the routing step.

2. The method according to claim 1 further comprising extending the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete.

3. The method according to claim 2 further comprising selecting the end-point cell from a plurality of cells of the reconfigurable processor configurable to operate as the end-point cell.

4. The method according to claim 3 wherein the said plurality of cells configurable to operate as the end-point cell comprise one or more of the operational cells.

5. The method according to claim 3 wherein one or more of the operational cells are not comprised within the said plurality of cells configurable to operate as the end-point cell.

6. The method according to claim 2 comprising performing the post-routing step responsive to a determination that a longest critical path of the said signal processing paths determined in the routing step does not terminate at a cell configurable to operate as the end-point cell.

7. The method according to claim 2 wherein the post-routing step comprises: determining a plurality of possible extended signal processing paths, each of the said plurality of possible extended signal processing paths being determined by extending a respective one of the said signal processing paths determined in the routing step such that its critical path is longer than the longest critical path of the signal processing paths determined in the routing step and such that its critical path terminates at a cell configurable to operate as the end-point cell; and selecting the possible extended signal processing path which comprises the shortest extension of the plurality of possible extended signal processing paths.

8. The method according to claim 1 wherein the programmable interconnect comprises one or more interconnect cells.

9. The method according to claim 8 further comprising extending the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete, and selecting the end-point cell from a plurality of cells of the reconfigurable processor configurable to operate as the end-point cell, wherein the plurality of cells configurable to operate as the end-point cell comprise one or more of the interconnect cells.

10. The method according to claim 1 further comprising storing the extended signal processing path in a memory.

11. A compiler for compiling computer program instructions for implementation on a reconfigurable processor comprising a plurality of operational cells, each operational cell being connectable to and disconnectable from one or more of the other operational cells via a programmable interconnect, the compiler comprising a routing module configured to perform: a routing step in which one or more reconfigurable signal processing paths are determined for performing one or more signal processing operations defined by the computer program instructions, each reconfigurable signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step subsequent to the routing step in which an extended signal processing path is determined by extending one of the said signal processing paths such that a critical path of the extended signal processing path is longer than a longest critical path of the reconfigurable signal processing paths determined in the routing step.

12. The compiler according to claim 11 wherein the routing module is configured to extend the said signal processing path in the post-routing step such that the critical path of the extended signal processing path terminates at an end-point cell of the reconfigurable processor, the reconfigurable processor being configurable to derive from the end-point cell, or from one or more signals transmitted by the end-point cell, a trigger signal indicating that signal processing along the critical path of the extended signal processing path is complete.

13. The compiler according to claim 11 wherein the routing module is configured to perform the post-routing step responsive to a determination that a longest critical path of the said signal processing paths determined during the routing step does not terminate at a cell configurable to operate as the end-point cell.

14. The compiler according to claim 11 wherein in the post-routing step the routing module is configured to: determine a plurality of possible extended signal processing paths, each of the said plurality of possible extended signal processing paths being determined by extending one of the said signal processing paths determined in the routing step such that it comprises a critical path which is longer than the longest critical path of the said signal processing paths determined in the routing step and such that the critical path of the extended signal processing path terminates at a cell configurable to operate as the end-point cell; and to select the possible extended signal processing path which requires the shortest extension of the plurality of possible extended signal processing paths.

15. A reconfigurable processor comprising: a plurality of operational cells, each operational cell being connectable to and disconnectable from one or more of the other operational cells via a programmable interconnect; and routing circuitry configured to implement a first signal processing configuration comprising one or more first reconfigurable signal processing paths each comprising two or more of the said plurality of operational cells connected via the said programmable interconnect, each reconfigurable signal processing path having a critical path, wherein a longest critical path of the said first signal processing configuration terminates at an end-point cell, the reconfigurable processor being configured to derive from the end-point cell, or from one or more signals transmitted by the end-point cell, a trigger signal indicating that signal processing along the longest critical path is complete, and wherein the reconfigurable processor is further configured to route the said trigger signal to the routing circuitry, the routing circuitry being configured to reconfigure the processor in accordance with a second signal processing configuration comprising one or more second reconfigurable signal processing paths responsive to the said trigger signal.

16. A reconfigurable processor according to claim 15 wherein the operational cells comprise one or more asynchronous operational cells or the operational cells consist of asynchronous operational cells.

17. A reconfigurable processor according to claim 16 wherein the routing circuitry is configured to reconfigure the processor in direct response to the said trigger signal.

18. The reconfigurable processor according to claim 15 wherein the end-point cell is in electronic communication with the routing circuitry via trigger signal derivation circuitry.

19. The reconfigurable processor according to claim 18 wherein the trigger signal derivation circuitry is configurable to select the end-point cell from a plurality of cells configurable to operate as the end-point cell and to derive the trigger signal from the selected end-point cell or from one or more signals transmitted therefrom.

20. The reconfigurable processor according to claim 18 wherein the trigger signal derivation circuitry is configured to derive the trigger signal from a signal transmitted by the end-point cell when signal processing along the longest critical path of the first configuration is complete.

21. A computing device comprising: a non-transitory computer readable medium storing computer readable code; a processor configured to execute the computer readable code so as to be configured as a compiler of computer program instructions for implementation on a reconfigurable processor comprising a plurality of operational cells, each operational cell being connectable to and disconnectable from one or more of the other operational cells via a programmable interconnect, the compiler comprising a routing module configured to perform: a routing step in which one or more reconfigurable signal processing paths are determined for performing one or more signal processing operations defined by the computer program instructions, each reconfigurable signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step subsequent to the routing step in which an extended signal processing path is determined by extending one of the said signal processing paths such that a critical path of the extended signal processing path is longer than a longest critical path of the reconfigurable signal processing paths determined in the routing step.

22. A non-transitory computer readable medium storing computer readable code which when executed by a computing device causes the computing device to provide functionality comprising: a compiler of computer program instructions for implementation on a reconfigurable processor comprising a plurality of operational cells, each operational cell being connectable to and disconnectable from one or more of the other operational cells via a programmable interconnect, the compiler comprising a routing module configured to perform: a routing step in which one or more reconfigurable signal processing paths are determined for performing one or more signal processing operations defined by the computer program instructions, each reconfigurable signal processing path comprising two or more of the operational cells connected via the programmable interconnect, the said signal processing paths being capable of implementation on the said operational cells and the said interconnect of the reconfigurable processor to perform the said one or more signal processing operations; and a post-routing step subsequent to the routing step in which an extended signal processing path is determined by extending one of the said signal processing paths such that a critical path of the extended signal processing path is longer than a longest critical path of the reconfigurable signal processing paths determined in the routing step.

* * * * *